(12) United States Patent
Roberts et al.

(10) Patent No.: US 12,307,514 B2
(45) Date of Patent: May 20, 2025

(54) NESTED CAPACITY PLANS

(71) Applicant: Simnang IP, LLC, Farmington, UT (US)

(72) Inventors: Rhett M. Roberts, Kaysville, UT (US); Jacob Heaps, Kaysville, UT (US); Cooper Smith, West Point, UT (US)

(73) Assignee: Simnang IP, LLC, Farmington, UT (US)

( * ) Notice: Subject to any disclaimer, the term of this patent is extended or adjusted under 35 U.S.C. 154(b) by 117 days.

(21) Appl. No.: 18/100,395

(22) Filed: Jan. 23, 2023

(65) Prior Publication Data

US 2024/0249351 A1 Jul. 25, 2024

(51) Int. Cl.
*G06Q 40/03* (2023.01)
(52) U.S. Cl.
CPC .................................. *G06Q 40/03* (2023.01)
(58) Field of Classification Search
CPC ...................................................... G06Q 40/03
See application file for complete search history.

(56) References Cited

U.S. PATENT DOCUMENTS

| | | | |
|---|---|---|---|
| 10,019,697 | B2 | 7/2018 | Ang et al. |
| 2007/0250442 | A1 | 10/2007 | Hogan et al. |
| 2009/0030819 | A1 | 1/2009 | Vanleeuwen |
| 2010/0205094 | A1 | 8/2010 | Evans |
| 2017/0046667 | A1 | 2/2017 | Feng et al. |
| 2017/0186085 | A1 | 6/2017 | Nagla |
| 2018/0109424 | A1* | 4/2018 | Krishnaswamy ........ H04L 41/12 |
| 2020/0241929 | A1 | 7/2020 | Arrasjid et al. |
| 2021/0133868 | A1 | 5/2021 | Brock et al. |
| 2022/0138845 | A1 | 5/2022 | Shepherd et al. |
| 2024/0095823 | A1* | 3/2024 | Roberts .............. G06Q 20/0855 |

FOREIGN PATENT DOCUMENTS

WO WO-2016/191931 12/2016

OTHER PUBLICATIONS

Citigroup, Inc., "Citi Flex Loan Access cash from your Citi card's existing credit line", https://www.citi.com/credit-cards/flex-loan.
Karp, "Citi Flex Plan: What It Is and How It Works", Nerdwallet, Dec. 7, 2021, https://www.nerdwallet.com/article/credit-cards/citi-flex-plan-what-it-is-and-how-it-works.
Papandrea, "What Is a Citi Flex Plan and How Does It Work?", The Balance Money, Mar. 22, 2022, https://www.thebalancemoney.com/what-is-a-citi-flex-plan-5081199#:~:text=Citi Flex Pay lets you, using a fixed monthly payment.
International Search Report and Written Opinion dated Apr. 15, 2024, for PCT/US2023/085681.

* cited by examiner

*Primary Examiner* — Scott S Trotter
(74) *Attorney, Agent, or Firm* — Foley & Lardner LLP

(57) ABSTRACT

Capacity plans may be linked in a nested hierarchy, with customizable linking configurations controlling how the capacity plans are linked. The linking configurations may control how an available credit of a flexible capacity plan is affected by linked capacity plans lower in the nested hierarchy. Payments may be applied to the linked capacity plans based on customizable payment configurations.

21 Claims, 10 Drawing Sheets

General Info

Amount: $1,000.00
Payment Method Name: Check
Payment Type: Regular
Apply Date: 01/05/2023
Info: Payment Split Info
Billing Cycle: 3
Author: LoanPro 9595
Created: 01/05/2023 03:40:30 PM MST Additional Info Authorization Code: -

Split Details

Loan Demo ABC - Loan 1: $709.95
Loan Demo ABC - Loan 2: $236.67
LOC Demo ABC - Child LOC: $53.18

FIG. 6

NESTED CAPACITY PLANS

BACKGROUND

The present disclosure relates generally to the field of capacity plan technology. In a computer networked environment, such as the Internet, users, and entities such as people or companies participate in exchanges (e.g., transactions). The exchanges may involve terms that indicate how a computer is to process and/or update data for the exchanges over time. Storing data for the exchanges, including the terms, can involve storing data for the exchanges of a capacity plan in a single database (or collective record). Accordingly, concurrently processing the data, such as payment data, for multiple capacity plans can involve significant processing power to determine functions or terms to apply to the data of the exchanges and then execute the functions or terms of the data.

SUMMARY

Systems and methods are disclosed for linking capacity plans in a nested hierarchy and for determining applications of payments to linked capacity plans based on payment configurations.

BRIEF DESCRIPTION OF THE DRAWINGS

FIG. 4 illustrates an example user interface, according to some embodiments.

FIG. 6 illustrates an example record of a payment applied to linked capacity plans, according to some embodiments.

Figure 1:
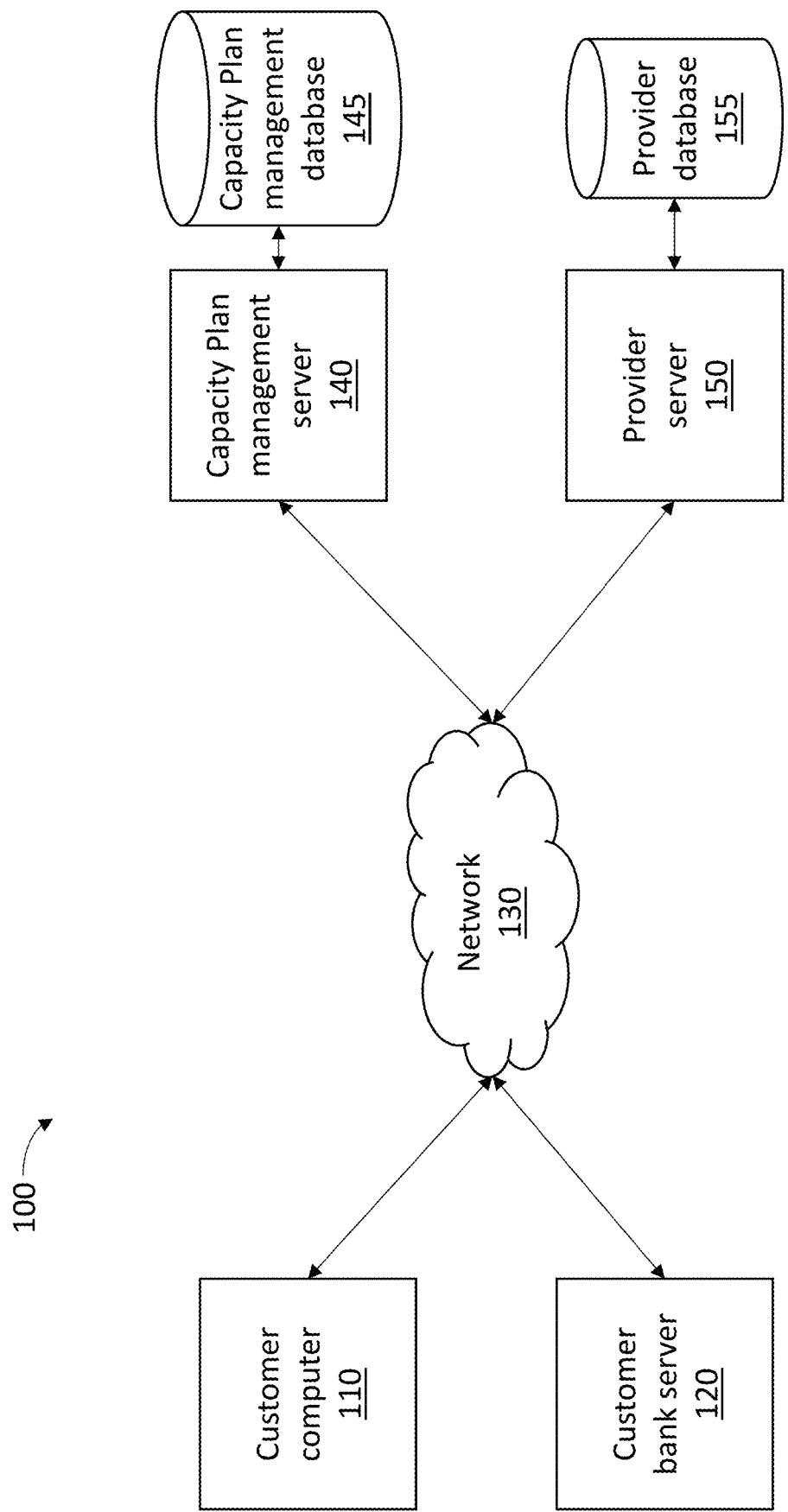
FIG. 1 is a block diagram illustrating an example provider system and computing environment, according to some embodiments.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

The systems and methods described herein relate to multi-data structure architecture for recording, managing, and updating exchange data. The systems and methods described herein solve the technical problem of updating multiple capacity plans based on a single payment. Conventional systems require significant user input and iterative calculations for each capacity plan, requiring large amounts of time for calculations and consuming burdensome amounts of processing resources. Linking capacity plans to a wrapper flexible capacity plan based on link configurations and applying payments made to the wrapper flexible capacity plan according to payment configurations reduces the user input and iterative calculations required for updating multiple capacity plans based on a single payment. The embodiments discussed herein improve the function of a computer by reducing the processing resources required to update multiple capacity plans based on a single payment. Furthermore, the embodiments discussed herein represent an improvement in the field of capacity plan management. Conventional systems that provide a fixed capacity plan in association with a flexible capacity plan require that due dates of the fixed capacity plan are aligned with due dates of the flexible capacity plan, and due amounts of the fixed capacity plan are simply incorporated into a minimum payment amount of the flexible capacity plan. The embodiments discussed herein, by the use of link configurations and payment configurations, allow for flexibility and customization in linking capacity plans, each with unique terms, to a wrapper flexible capacity plan. Furthermore, the embodiments herein are incorporated into at least the practical applications of providing a flexible capacity plan wrapper for multiple capacity plans, generating linked capacity plans based on parameters of the flexible capacity plan wrapper, and applying payments made to the flexible capacity plan wrapper to multiple capacity plans linked to the flexible capacity plan wrapper.

As used herein, a "capacity plan" can be an account, such as an installment loan or line of credit (LOC), enabling customers (e.g., borrowers) of service providers (e.g., financial institutions ("FI"), credit card institutions, other borrowing/lending services) to draw on the account when the customer desires to borrow funds (e.g., fiat money, digital currency, cryptocurrency) or other assets (e.g., physical, or digital). A fixed capacity plan, such as an installment loan, may provide a one-time disbursement of a fixed capacity or amount. A flexible capacity plan, such as a LOC may provide a preset capacity or limit that can be drawn on a flexible number of times as needed up to the preset capacity.

FIG. 1 is a block diagram of an example computing environment 100, according to some embodiments of the present disclosure. The computing environment may include or otherwise provide a system for managing capacity plans. The computing environment 100 may include a customer computer 110, a customer bank server 120, a network 130, a capacity plan management server 140, a capacity plan management database 145, a provider server 150, and a provider database 155. The customer computer 110, the customer bank server 120, the capacity plan management server 140, and the provider server 150 may communicate with each other via the network 130. The network 130 may be any type of network such as a WAN or the Internet. The customer computer 110 may be a computing device of a customer having a flexible capacity plan with a provider of or associated with the provider server 150. The customer bank server 120 may be a server of a bank associated with the customer, such that the customer may make and receive payments using the customer bank server 120. The capacity plan management server 140 may be or include any computing device capable of performing the various processes described herein. Non-limiting examples of the capacity plan management server 140 include a server computer, workstation computer, tablet computer, and the like. The capacity plan management server 140 may communicate with the capacity plan management database 145. The capacity plan management database 145 may store information regarding the capacity plan(s) of the customer(s) based on information received by the capacity plan management server 140 from the provider server 150 and/or the customer computer 110. In some embodiments, the capacity plan management server 140 may communicate with the capacity plan management database 145 via the network 130. The provider server 150 may be a server, or other computing device, associated with the provider of capacity plans (e.g., a lender providing loans). The provider may issue or otherwise provide the capacity plan(s) to the customer. The provider server 150 may communicate with the provider database 155. The provider database 155 may store information regarding the capacity plan(s) of the customer.

The customer bank server 120 may transmit payment (e.g. funds) from an account of the customer to the provider server 150 and/or an account of the provider. In some embodiments, the customer bank server 120 and the provider server 150 may be managed by a single entity, or may be the same device. For example, the customer may have an account at a bank and also have a capacity plan (e.g., a loan) issued or otherwise provided by the same bank. In this example, the bank may manage accounts and loans using a same server or different servers.

The customer bank server 120 may transmit customer payments or notifications of customer payments to the provider server 150. In some embodiments, the customer computer 110 may direct the customer bank server 120 to make a payment to the provider for the capacity plan(s) of the customer. In other embodiments, the capacity plan management server 140 may direct the customer bank server 120 to make the payment to the provider for the capacity plan(s) of the customer based on information received from the customer computer 110. For example, the customer computer 110 may transmit instructions to the capacity plan management server 140 to make a payment to a capacity plan of the customer. The capacity plan management server 140 may transmit a second instruction to the customer bank server 120 to transmit the payment to the provider server 150. In some embodiments, the computing environment 100 includes a plurality of provider servers. The capacity plan management server 140 may receive an instruction from the customer computer 110 to make payment(s) to repay at least a portion of the capacity plan(s) of the customer associated with the plurality of provider servers. The capacity plan management server 140 may transmit a second instruction to the customer bank server 120 to transmit the payment(s) to the plurality of provider servers. In some embodiments, the customer has multiple capacity plans associated with the provider server 150. The capacity plan management server 140 may receive an instruction from the customer computer to make a payment to repay at least a portion of the multiple capacity plans and determine how the payment is applied to the multiple capacity plans, as discussed herein. The capacity plan management server 140 may transmit a second instruction to the customer bank server 120 to transmit payment(s) to the provider server 150. In some embodiments, the computing system 100 includes a plurality of provider servers, each having one or more capacity plans associated with the customer. The capacity plan management server 140 may receive an instruction from the customer computer to make a payment to the multiple capacity plans and determine how the payment is applied or otherwise allocated to the multiple capacity plans, as discussed herein. The capacity plan management server 140 may transmit a second instruction to the customer bank server 120 to transmit payment(s) to the plurality of provider servers.

In some embodiments, the customer does not interact directly with the capacity plan management server 140. The customer may communicate with the provider server 150 which may communicate with the capacity plan management server 140 to determine how payments are applied to the multiple capacity plans. The provider may be a user of a capacity plan management service hosted on the capacity plan management server 140 and the customer may be a customer of the provider. In an example, the customer makes a payment at the customer computer 110. The customer computer transmits a payment indication to the provider server 150. The provider server 150 transmits the payment indication to the customer bank server 120 which transmits payment (e.g., actual funds) to the provider server 150. The provider server 150 transmits the payment indication to the capacity plan management server 140 which retrieves linked accounts of the customer from the capacity plan management database 145. The capacity plan management server 140 determines how the payment is applied or otherwise allocated to the linked accounts and transmits the payment allocation information to the provider server 150. The provider server 150 updates customer accounts in the provider database 155 based on the payment allocation information and sends the payment allocation information to the customer computer 110.

The capacity plan management server 140 may receive input from the customer computer 110 and/or the provider server 150 indicating a link configuration which determines how a linked plan modifies or otherwise relates to an available credit of the flexible capacity plan. The capacity plan management server 140 may generate the link between the flexible capacity plan and the linked plan (e.g., a fixed capacity plan) in the capacity plan management database 145 according to the link configuration and modify the available credit of the flexible capacity plan in the capacity plan management database. In an example, the provider server 150 may send customer input to the capacity plan management server 140 to allow a customer of the provider to link and unlink the customer's accounts with the customer's flexible capacity plan in the capacity plan management database 145 and modify links between the customer's accounts and the customer's flexible capacity plan to adjust how the customer's linked accounts affect the customer's flexible capacity plan. The capacity plan management server 140 may receive input from the customer computer 110 and/or the provider server 150 including a payment configuration. The capacity plan management server 140 may receive an indication of a payment to a flexible capacity plan and identify one or more linked plans linked, in the capacity plan management database 145, to the flexible capacity plan by a link. The capacity plan management server 140 may apply the payment to the one or more linked plans based on the payment configuration and the link. In an example, the provider server 150 may send customer input to the capacity plan management server 140 to allow a customer of the provider to provide a payment configuration to the capacity plan management server 140 such that a payment of the customer is allocated by the capacity plan management server 140 according to the payment configuration.

Figure 2:
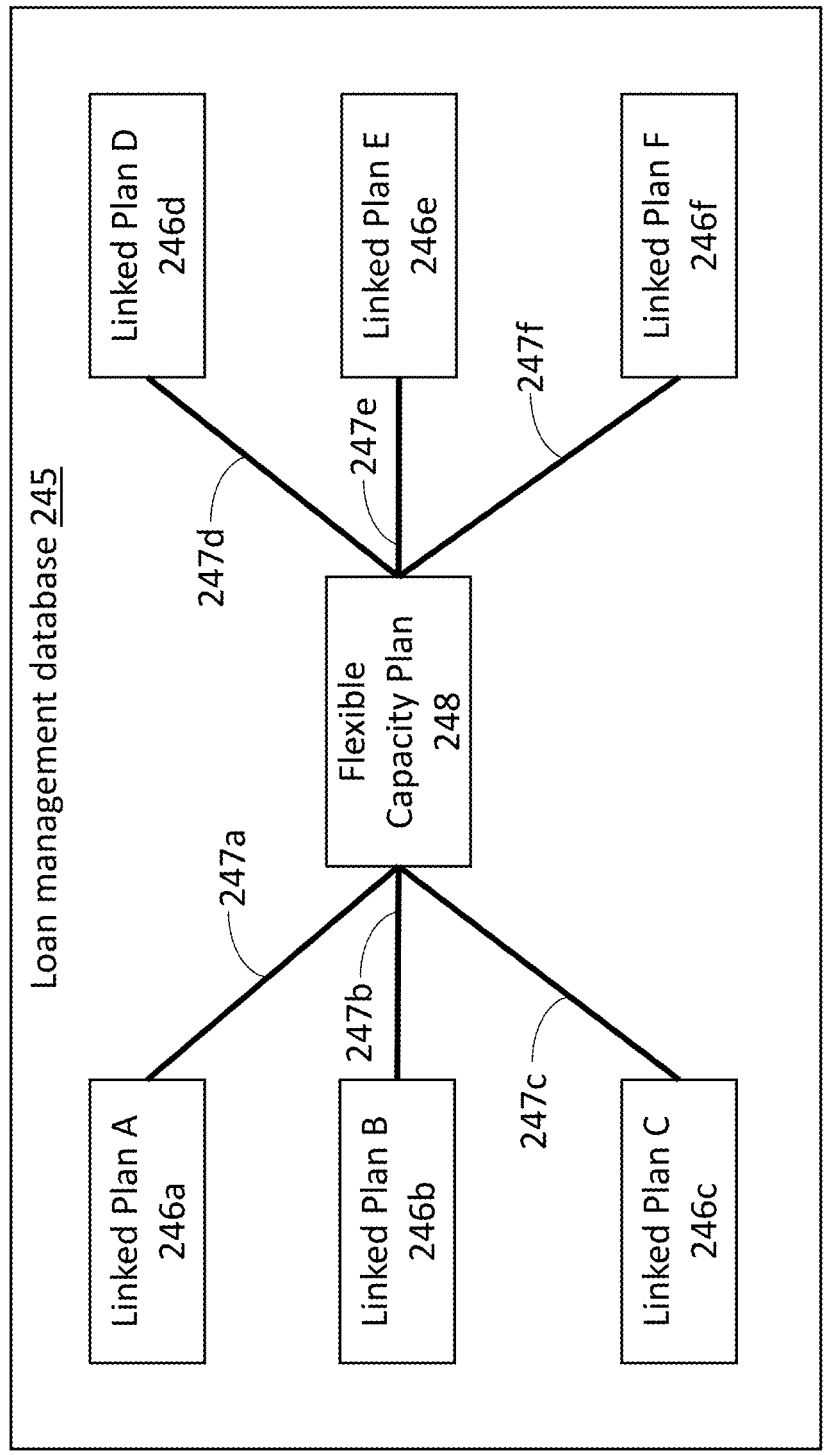
FIG. 2 is a block diagram illustrating linked capacity plans, according to some embodiments.

FIG. 2 is a block diagram illustrating linked capacity plans in a capacity plan management database 245, according to some embodiments. In some embodiments, the capacity plan management database 245 may be the capacity plan management database 145 of FIG. 1. The capacity plan management database 245 may include a linked plan A 246a, a linked plan B 246b, a linked plan C 246c, a linked plan D 246d, a linked plan E 246e, and a linked plan F, referred to collectively as linked plans 246. The linked plans 246 may each include one or more of a contract date, a principal amount, a payoff amount, an available credit, an interest rate, a payment schedule, a billing cycle, and a provider identifier. The each of the linked plans 246 may be either a flexible capacity plan or a fixed capacity plan. In an example, the linked plans 246a, 246b, and 246c are flexible capacity plans and the linked plans 246d, 246e, and 246f are fixed capacity plans.

The capacity plan management database 245 may include a link A 247a, a link B 247b, a link C 247c, a link D 247d, a link E 247e, and a link F 247f, referred to collectively as links 247. The links 247 may each link the linked plans 246 to a flexible capacity plan 248. The flexible capacity plan 248 may include one or more of a credit limit, an available credit, a balance, an interest rate, a contract date, and an end date. The linked plans 246 and the flexible capacity plan 248 may be associated with a customer. The links 247 may link the linked plans 246 to the flexible capacity plan 248 in a nested hierarchy, where the linked plans 246 are nested within or otherwise below or subordinate to the flexible capacity plan 248. The flexible capacity plan 248 may function as a wrapper for the linked plans 246. For example, a payment applied to the flexible capacity plan 248 may be applied to one or more of the linked plans 246 such that a customer may interact with the flexible capacity plan 248 in managing the flexible capacity plan 248 and the linked plans 246. In another example, a representation of the flexible capacity plan 248 may be based on the linked plans 246 such that a customer sees an aggregation of the linked plans 246 and the flexible capacity plan 248 in a representation of the flexible capacity plan 248. The links 247 may each have a link configuration determining how the linked plans 246 affect the flexible capacity plan 248, how the linked plans 246 are represented in relation to the flexible capacity plan 248, and/or how payments applied to the flexible capacity plan 248 are applied to the linked plans 246, as discussed herein.

Additional links may be created to link additional plans and one or more links of the links 247 may be destroyed or otherwise removed to unlink one or more of the linked plans 246. In some embodiments, a user (e.g., a lender) may create and destroy the links 247 for a customer (e.g., a borrower) to link and unlink the linked plans 246. In other embodiments, the user may allow the customer to create and destroy the links 247 to link and unlink the linked plans 246. In some embodiments, the user may modify the link configurations of the links 247. In other embodiments, the user may allow the customer to modify the link configurations of the links 247. In an example, a credit card issuer may allow a customer to link and unlink the customer's accounts with the customer's flexible capacity plan 248 in the capacity plan management database 245 and modify the links between the customer's accounts and the customer's flexible capacity plan 248 to adjust how the customer's linked accounts 246 affect the customer's flexible capacity plan 248.

In some embodiments, the flexible capacity plan 248 may include one or more containers. As used herein, a container or bucket provides a set of terms (or rules) for handling exchanges, or transactions, of the capacity plan as specified by configuration parameters. A container can be considered to define a sub-account or sub-line of credit (SLOC), with configuration parameters unique to the sub-account. The configuration parameters can include a set of terms by which an exchange or transaction is handled by the container. The flexible capacity plan 248 may include a plurality of containers and can have the same or different configuration parameters for each container. In an example, the flexible capacity plan 248 includes two containers: healthcare and travel. The healthcare container has a credit limit of $2,000 and the travel container has a credit limit of $1,000, giving the flexible capacity plan 248 a credit limit of $3,000. A transaction associated with the healthcare container is counted towards the healthcare container credit limit and is added to a healthcare container balance. A payment towards the flexible capacity plan 248 is tagged as corresponding to the healthcare container such that the balance of the healthcare container is reduced by an amount of the payment.

Figure 3:
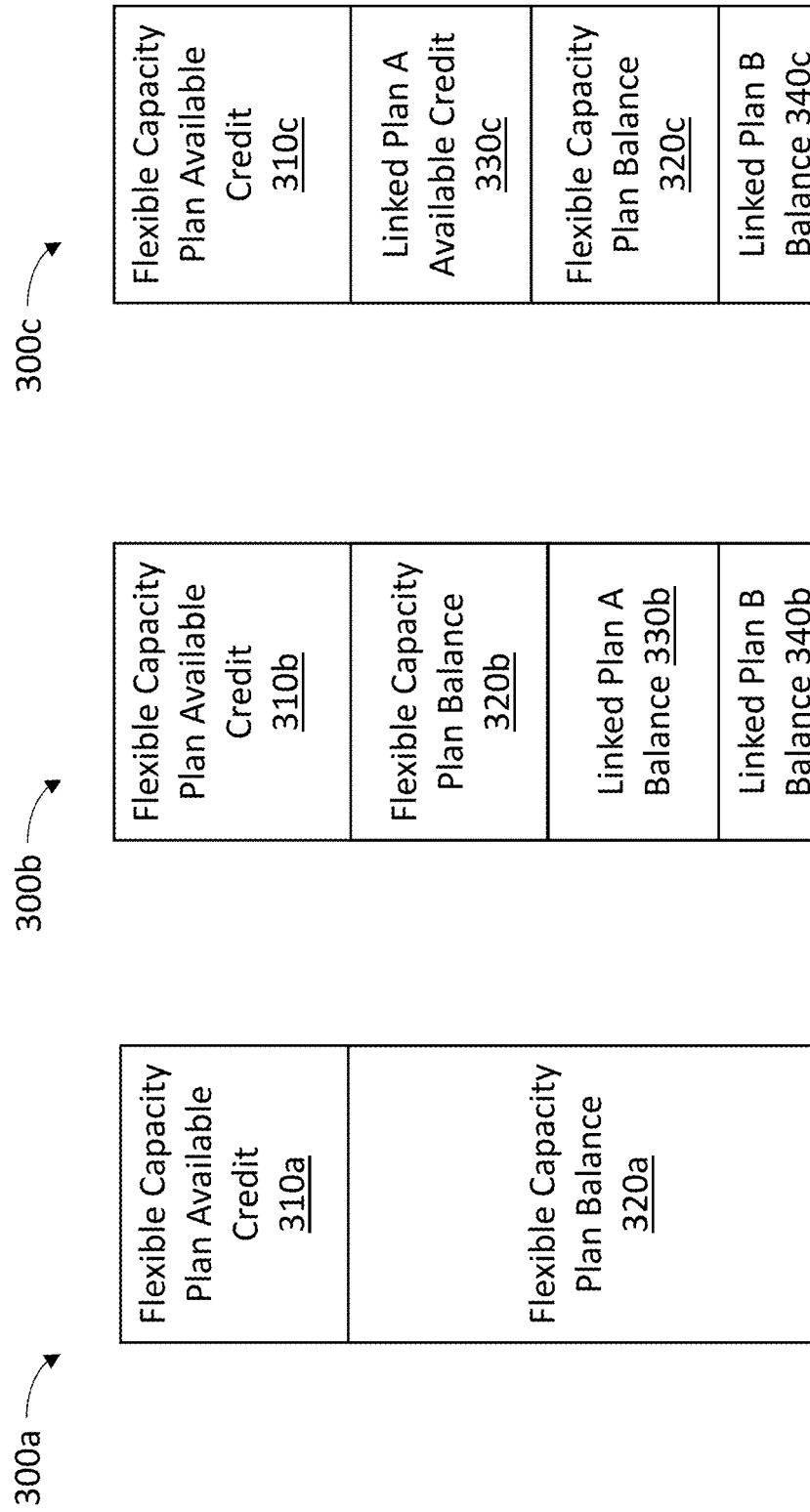
FIGS. 3A, 3B, and 3C illustrate examples of linked capacity plans affecting an available amount of a flexible capacity plan, according to some embodiments.

FIGS. 3A-3C illustrate examples of linked capacity plans affecting an available amount (e.g., available credit) of a flexible capacity plan, according to some embodiments. FIG. 3A illustrates a flexible capacity plan 300a. The flexible capacity plan 300a may include a flexible capacity plan balance 320a and a flexible capacity plan available credit 310a. The flexible capacity plan balance 320a may represent a balance, or an amount owed on the flexible capacity plan 300a. The flexible capacity plan available credit 310a may represent unused credit associated with the flexible capacity plan 300a. A sum of the flexible capacity plan available credit 310a and the flexible capacity plan 320a may represent a credit limit, or total capacity of the flexible capacity plan 300a.

FIG. 3B illustrates a flexible capacity plan 300b linked to a linked plan A and a linked plan B, where the linked plan A and the linked plan B affect an available credit of the flexible capacity plan 300b based on the links between the flexible capacity plan 300b and the linked plan A and the linked plan B. The flexible capacity plan 300b, the linked plan A, and the linked plan B may each have different parameters or terms. For example, the flexible capacity plan 300b may have an interest rate of 12%, the linked plan A may have an interest rate of 6%, and the linked plan B may have an introductory interest rate of 3% for the first 3 months and then an interest rate of 6% thereafter. In another example, the flexible capacity plan 300b may have monthly billing cycle with payments due on the first of each month, the linked plan A may have a monthly billing cycle with payments due on the eighth of each month, and the linked plan B may have a semi-monthly billing cycle with payments due on the first and fifteenth of each month. In some embodiments, the linked plan A and the linked plan B are fixed capacity plans. In some embodiments, the flexible capacity plan 300b is linked to additional linked plans which do not affect the available credit of the flexible capacity plan 300b. In some embodiments, the flexible capacity plan 300b represents the same flexible capacity plan as the flexible capacity plan 300a, where the flexible capacity plan 300a illustrates an aggregate view of the flexible capacity plan balance 320a while the flexible capacity plan 300b illustrates a detailed view of the flexible capacity plan balance 320a. For example, a customer may choose to see an aggregate view of their balance and available credit, such as the flexible capacity plan 300a, or a detailed view of the balance and available credit including details on linked capacity plans, such as the flexible capacity plan 300b.

The flexible capacity plan 300b may include a flexible capacity plan available credit 310b, a flexible capacity plan balance 320b, a linked plan A balance 330b, and a linked plan B balance 340b. The flexible capacity plan balance 320b, the linked plan A balance 330b, and the linked plan B balance 340b may sum to equal a total flexible capacity plan balance. A sum of the total flexible capacity plan balance and the flexible capacity plan available credit 310b may equal a total capacity, or credit limit, of the flexible capacity plan 300b. The flexible capacity plan balance 320b may be an amount owed, or balance, associated with the flexible capacity plan 300b. The linked plan A balance 330b may reduce the flexible capacity plan available credit 310 by an amount of the linked plan A balance 330b. In some embodiments, the linked plan A balance 330b is a principal amount of the linked plan A. In other embodiments, the linked plan A balance 330b is a payoff amount, equal to the principal amount plus interest and fees, of the linked plan A. The linked plan B balance 340b may reduce the flexible capacity plan available credit 310 by an amount of the linked plan B balance 340b. In some embodiments, the linked plan B balance 340b is a principal amount of the linked plan B. In other embodiments, the linked plan B balance 340b is a payoff amount, equal to the principal amount plus interest and fees, of the linked plan B.

The flexible capacity plan 300b may function as a wrapper to the linked plan A and the linked plan B, enabling or otherwise allowing a customer to view the linked plans A and B as part of, or nested within, the flexible capacity plan 300b.

In some embodiments, the linked plan A and the linked plan B are generated based on the parameters of the flexible capacity plan 300b. In an example, the linked plan A and the linked plan B are generated based on the flexible capacity plan balance 320a of FIG. 3A to achieve the flexible capacity plan 300b of FIG. 3B, where FIGS. 3A and 3B represent a single flexible capacity plan before and after generating the linked plan A and linked plan B based on the flexible capacity plan balance 320 of FIG. 3A. The total balance of the flexible capacity plan 300a and the total balance of the flexible capacity plan 300b are the same, with a first portion of the flexible capacity plan balance 320a allocated to the linked plan A balance 330b and a second portion of the flexible capacity plan balance 320a allocated to the linked plan B balance 340b based on the links between the flexible capacity plan 300c and the linked plan A and the linked plan B. In a similar example, a credit card issuer may offer a customer the option of converting a portion of the customer's credit card balance into an installment loan.

FIG. 3C illustrates a flexible capacity plan 300c linked to a linked plan A and a linked plan B, where the linked plan A and the linked plan B affect an available credit of the flexible capacity plan 300c based on the links between the flexible capacity plan 300c and the linked plan A and the linked plan B. The flexible capacity plan 300c may include additional linked plans which do not affect the available credit of the flexible capacity plan 300c based on the links between the flexible capacity plan 300c and the additional linked plans. The flexible capacity plan 300c, the linked plan A, and the linked plan B may each have different parameters. The linked plan A may be a flexible capacity plan and the linked plan B may be a fixed capacity plan. For example, the flexible capacity plan 300c may have a credit limit of $1,000 and have an interest rate of 12%, the linked plan A may have a credit limit of $900 and have an interest rate of 10%, and the linked plan B may have a principal balance of $1,100 and have an interest rate of 6%. A sum of the linked plan A available credit 330c and a flexible capacity plan available credit 310c may equal a total available credit of the flexible capacity plan 300c. The flexible capacity plan 300c may include a flexible capacity plan balance 320c and a linked plan B balance 340c which sum to equal a total balance of the flexible capacity plan 300c. In some embodiments, the flexible capacity plan 300c includes a linked plan A balance which contributes to the total balance of the flexible capacity plan 300c.

The flexible capacity plan 300c may function as a wrapper to the linked plan A and the linked plan B, allowing a customer to view the linked plans A and B as part of, or nested within, the flexible capacity plan 300c.

In some embodiments, the linked plan A and the linked plan B are generated based on the parameters of the flexible capacity plan 300c. In an example, the linked plan A is generated based on a portion of the flexible capacity plan available credit 310c and the linked plan B is generated based on the flexible capacity plan balance 320c. The total available credit of the flexible capacity plan 300c and the total balance of the flexible capacity plan 300c remain the same, with the portion of the flexible capacity plan available credit 310c allocated to the linked plan A available credit 330c and the portion of the flexible capacity plan balance 320c allocated to the linked plan B balance 340c based on the links between the flexible capacity plan 300c and the linked plan A and the linked plan B. In a similar example, a credit card issuer may offer a customer the option of converting a portion of the customer's credit card balance into an installment loan and the option of converting a portion of the customer's available credit into an installment loan.

A user may modify the links between the flexible capacity plan 300c and the linked plans A and B. Each respective link may have a link configuration which controls how the respective linked plan affects the available credit and/or the balance of the flexible capacity plan 300c. The user may modify the link configurations to modify the flexible capacity plan 300c. In some embodiments, the user may modify the link configurations. In other embodiments, the user may allow a borrower to modify the link configuration. For example, a provider may allow a borrower to choose settings which modify the link configurations of links between the borrower's flexible capacity plan and their linked accounts.

Figure 4:
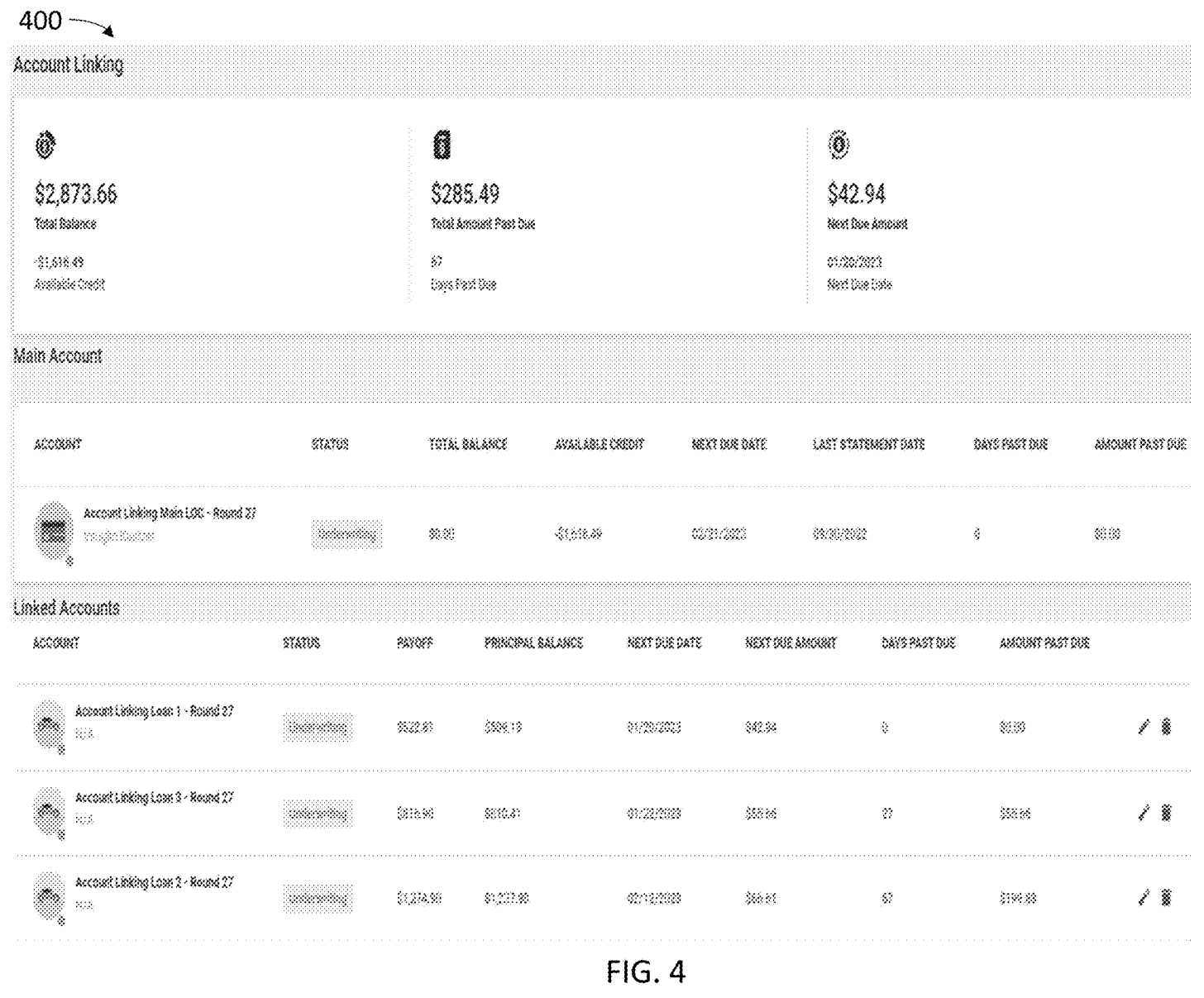

FIG. 4 illustrates an example user interface 400, according to some embodiments. The user interface 400 may display a main account of a nested hierarchy of accounts. The main account may be a flexible capacity plan. The flexible capacity plan may be linked to one or more linked accounts via links. Based on link configurations of the links, the one or more linked accounts may or may not affect an available credit and/or a balance of the flexible capacity plan. In some embodiments, the one or more linked accounts may affect the available credit and balance of the flexible capacity plan, such that the available credit and balance of the flexible capacity plan represent a total available credit and total balance of a borrower. In other embodiments, the one or more linked accounts may not affect the available credit and balance of the flexible capacity plan, such that the total available credit and total balance of the borrower are a sum of the available credit and balance of the flexible capacity plan and the available credits and balances of the one or more linked accounts. A user of the user interface 400 may adjust one or more settings to cause the user interface 400 to display an aggregate view of the flexible capacity plan and the one or more linked accounts, where the aggregate view shows the total available credit and total balance. The user may adjust the one or more settings to display a detailed view of the flexible capacity plan and the one or more linked accounts, where the detailed view shows the balance and available credit for each of the flexible capacity plan and the one or more linked accounts. In an example, a provider may configure the user interface 400 such that borrowers see the aggregate view. In another example, the provider may configure the user interface 400 such that the borrower see the detailed view. In yet another example, the provider may allow the borrowers to configure the user interface 400 to select the aggregate or the detailed view. The flexible capacity plan may function as a wrapper to the linked accounts, allowing a customer to view the linked accounts as part of, or nested within, the flexible capacity plan.

Figure 5:
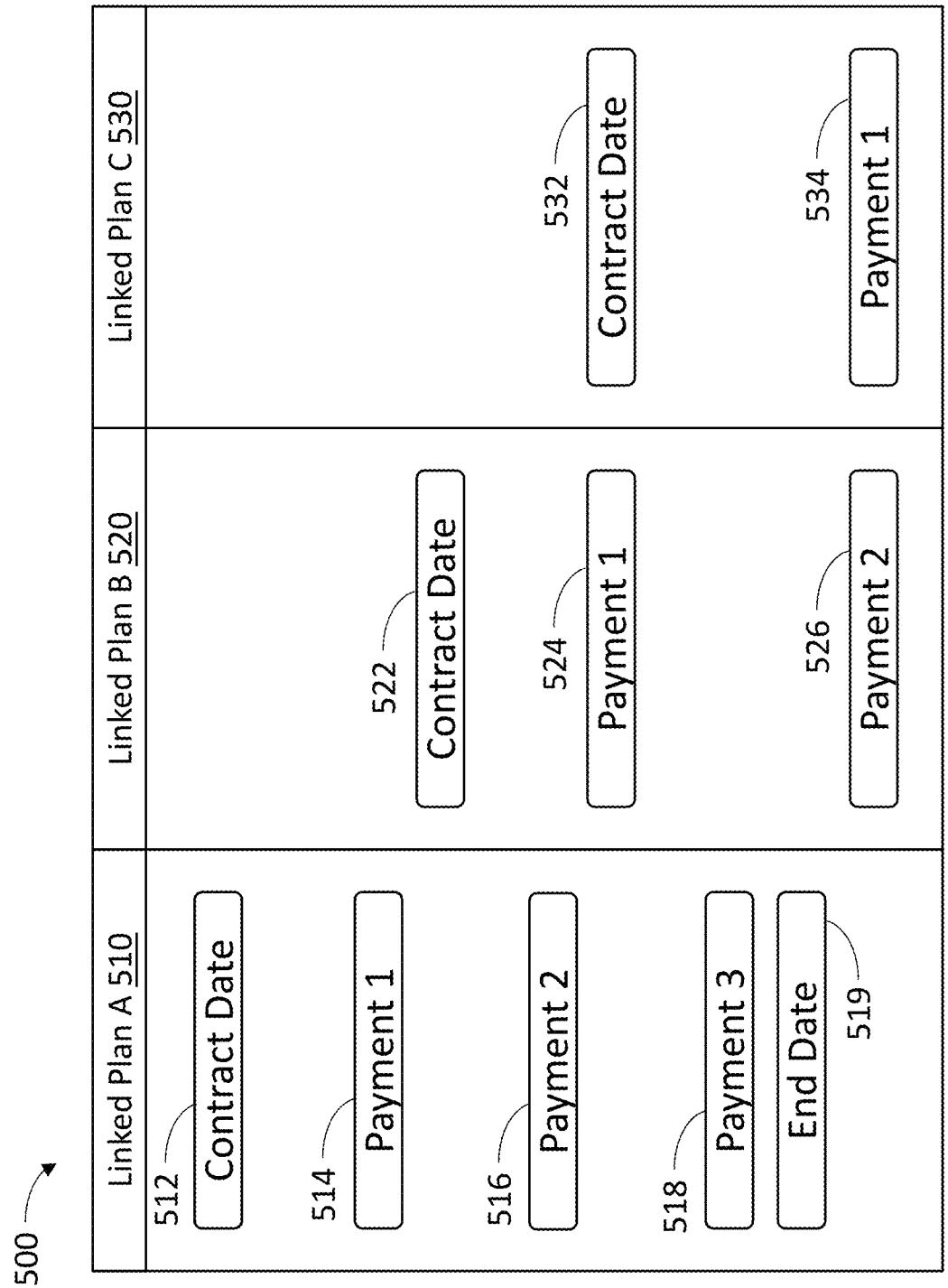
FIG. 5 illustrates example capacity plan parameters for determining a payment configuration, according to some embodiments.

FIG. 5 illustrates example capacity plan parameters 500 for determining a payment configuration, according to some embodiments. The capacity plan may include a linked plan A 510, a linked plan B 520, and a linked plan C 530, so the capacity plan parameters 500 may include parameters for linked plan A 510, linked plan B 520, and linked plan C 530. The linked plans A, B, C 510, 520, 530 may be linked to a flexible capacity plan as discussed in FIGS. 2-3C. The linked plan A 510 may have a contract date 512, a first payment date 514, a second payment date 516, a third payment date 518, and an end date 519. The contract date 512 may be a date on which the linked plan A 510 was created, and the end date 519 may be a date on which the linked plan A 510 is concluded. The payment dates 514, 516, 518 may each include a payment due date and an amount of a payment for the linked plan A 510. The linked plan B 520 may have a contract date 522, a first payment date 524, a second payment date 526, a third payment date, and an end date. The contract date 522 may be a date on which the linked plan B 520 was created, and the end date may be a date on which the linked plan B 520 is concluded. The payment dates 524 and 526 may each include a payment due date and an amount of a payment for the linked plan B 520. The linked plan C 530 may have a contract date 532, a first payment date 534, a second payment date, a third payment date, and an end date. The contract date 532 may be a date on which the linked plan C 530 was created, and the end date may be a date on which the linked plan C 530 is concluded. The payment date 534 may include a payment due date and an amount of a payment for the linked plan C 530.

A payment configuration may determine how a payment is applied to the linked plans A, B, C, 510, 520, 530. The payment may be made to the flexible capacity plan and applied to the linked plans A, B, C, 510, 520, 530 according to the payment configuration. The flexible capacity plan may provide or otherwise function as a wrapper to the linked plans A, B, C, 510, 520, 530, allowing a borrower to make a payment to the flexible capacity plan which will be applied to the linked plans A, B, C, 510, 520, 530. In some embodiments, the payment configuration may be received as user input. For example, a provider may provide the payment configuration which will be applied to the payment made by a customer to the customer's flexible payment plan. In other embodiments, the payment configuration may be received as customer input along with the payment. For example, a provider may allow a customer to determine the payment configuration when making the payment to determine how the payment will be applied to the customer's accounts.

In some embodiments, the payment configuration may be based on a chronological order of the linked plans A, B, C, 510, 520, 530. The chronological order of the linked plans A, B, C, 510, 520, 530 may be determined based on the contract dates 512, 522, and 532. The payment configuration may cause the payment to be applied to the linked plans A, B, C, 510, 520, 530 in order of their contract dates 512, 522, and 532. In an example, a first portion of the payment is applied to the linked plan A 510 to pay off the linked plan A 510 having the earliest contract date 512. A remaining portion of the payment is applied to the linked plan B 520 having the next contract date 522. If the linked plan B 150 is paid off by the remaining portion, a further remaining portion is applied to the linked plan C 530 having the latest contract date 532. If the linked plan C 530 is paid off by the further remaining portion, a final remaining portion is applied to the flexible capacity plan.

In some embodiments, the payment configuration may be based on due amounts of the linked plans A, B, C, 510, 520, 530. The payment configuration may be based on due amount types of the due amounts. The due amount types may include a past due type.

In some embodiments, the payment configuration may be based on a chronological order of past due type due amounts. Due amounts that are past due of the linked plans A, B, C, 510, 520, 530 may be paid in full in chronological order of the due amounts that are past due. For example, a payment is made after the first payment date 524 with a payment configuration based on the chronological order of past due type due amounts. The first payment date 514, the second payment date 516, and the first payment date 524 are all past due. A first portion of the payment is applied to the linked plan A 510 equal to the amount of the first payment date 514, as the first payment date 514 is the first payment, chronologically, of the past due payments. A remaining portion of the payment is applied to the linked plan A 510 equal to the amount of the second payment date 516, as the second payment date 516 is the second payment, chronologically, of the past due payments. A further remaining portion of the payment is applied to the linked plan B 520 based on the first payment date 524 being the third payment, chronologically, of the past due payments.

In another example, three linked accounts (a first loan, a second loan, and a third line of credit (LOC)) have past due amounts as shown in Table 1.

TABLE 1

|  | Loan 1 | Loan 2 | LOC 3 |
|---|---|---|---|
| Due Date - Amount | Jan. 10, 2022 - $100<br>Feb. 10, 2022 - $100<br>Mar. 10, 2022 - $100 | Feb. 8, 2022 - $75<br>Mar. 8, 2022 - $75<br>Apr. 8, 2022 - $75 | Feb. 21, 2022 - $200<br>Mar. 21, 2022 - $200<br>Apr. 21, 2022 - $200 |

A payment of $400 to the flexible capacity plan is applied to the three linked accounts based on a chronological order of the past due amounts of Table 1 as shown in Table 2.

TABLE 2

| Payment Amount Remaining | Loan 1 Cumulative | Loan 2 Cumulative | LOC 3 Cumulative | Source |
|---|---|---|---|---|
| $400 | $0 | $0 | $0 |  |
| $300 | $100 | $0 | $0 | Loan 1 - Jan. 10, 2022 - $100 |
| $225 | $100 | $75 | $0 | Loan 2 - Feb. 8, 2022 - $75 |
| $125 | $200 | $75 | $0 | Loan 1 - Feb. 10, 2022 - $100 |

TABLE 2-continued

| Payment Amount Remaining | Loan 1 Cumulative | Loan 2 Cumulative | LOC 3 Cumulative | Source |
|---|---|---|---|---|
| $0 | $200 | $75 | $125 | LOC 3 - Feb. 21, 2022 - $200 |

Based on the payment allocation of Table 2, of the $400 payment, $200 is applied to the first loan, $75 is applied to the second loan, and $125 is applied to the third LOC.

In some embodiments, the payment configuration may be based on a pro rata chronological order of past due amounts. Due amounts that are past due of the linked plans A, B, C, 510, 520, 530 may be paid pro rata among past due amounts of each linked plan in chronological order of the due amounts that are past due. A first past due amount of each linked plan is paid pro rata before a second past due amount of each linked plan. In this way, the past due amounts of the linked plans A, B, C, 510, 520, 530 may be paid off at the same time. In an example, a payment is made to the flexible capacity plan after the first payment date 524 with a payment configuration based on the pro rata chronological order of past due amount. The first payment date 514, and the second payment date 516 (of linked plan A), and the first payment date 524 (of linked plan B) are all past due. The payment is $1,000, an amount of the first payment date 514 is $900, an amount of the first payment date 524 is $450, and an amount of the second payment date 516 is $150. The past due payments are sorted into groups chronologically, with the first payment date 514 in a first group and the second payment date 516 and the first payment date 524 in a second group. The first payment date 514 is paid first, with $900 of the payment applied to the linked plan A 510. The second payment date 516 and the first payment date 524 are paid pro rata. A sum of the amounts of the first payment date 514 and the first payment date 524 is $600. The amount of the first payment date 524 is 450/600, or ¾ of the sum. The amount of the second payment date 516 is 150/600, or ¼ of the sum. Accordingly, a first portion of the remaining $100 of the payment equal to ¾ of the remaining $100 of the payment, or $75, is applied to the linked plan B 520 for the first payment date 524 and a second portion of the remaining $100 of the payment equal to ¼ of the remaining $100 of the payment, or $25 is applied to the linked plan A 510.

In another example, a payment is made to the flexible capacity plan after the second payment date 526 and the first payment date 534 such that the first payment date 514, the second payment date 516, the third payment date 518, the first payment date 524, the second payment date 526, and the first payment date 534 are past due. The payment dates are sorted into groups chronologically, with the first payment date 514 in a first group, the second payment date 516 and the first payment date 524 in a second group, and the third payment date 518, the second payment date 526, and the first payment date 534 in a third group. A first portion of the payment is applied to the first payment date 514. A remaining portion, if any, of the payment is applied to the second payment date 516 and the first payment date 524 pro rata. A further remaining portion of the payment is applied to the third payment date 518, the second payment date 526, and the first payment date 534 pro rata.

In another example, three linked accounts a first loan, a second loan, and a third line of credit (LOC)) have past due amounts grouped into chronological groupings, as shown in Table 3.

TABLE 3

| Account | Group 4 | Group 3 | Group 2 | Group 1 |
|---|---|---|---|---|
| Loan 1 | $100 | $100 | $100 | $100 |
| Loan 2 | — | $75 | $75 | $75 |
| LOC 3 | — | $200 | $200 | $200 |
| Total | $100 | $375 | $375 | $375 |

A payment of $1,000 is applied to the three linked accounts based on a pro rata allocation per grouping, as shown in Table 4.

TABLE 4

| Payment Amount Remaining | Loan 1 Portion (Cumulative) | Loan 2 Portion (Cumulative) | LOC 3 Portion (Cumulative) | Group Number |
|---|---|---|---|---|
| $1,000 | $0 | $0 | $0 | — |
| $900 | $100 ($100) | $0 ($0) | $0 ($0) | 4 |
| $525 | $100 ($200) | $75 ($75) | $200 ($200) | 3 |
| $150 | $100 ($300) | $75 ($150) | $200 ($400) | 2 |
| $0 | $[40 = 150*100/375] ($340) | $[30 = 150*75/375] ($180) | $[80 = 150*200/375] ($480) | 1 |

Based on the payment allocation of Table 4, of the $1,000 payment, $340 is applied to the first loan, $180 is applied to the second loan, and $480 is applied to the third LOC.

The payment configuration may be based on past due amounts as well as chronological order. For example, if the payment is applied to the past due amounts as in the above examples and a portion of the payment remains, the remaining portion of the payment may be applied to the linked plans A, B, C, 510, 520, 530 in chronological order, as discussed herein.

In some embodiments, the payment configuration may be based on a pro rata application of the payment to past due amounts of the linked plans A, B, C, 510, 520, 530 based on relative sizes of balances of the linked plans A, B, C, 510, 520, 530. Thus, the payment is applied to the past due amounts, with linked plans with higher balances receiving proportionally larger portions of the payment.

In an example, three linked accounts a first loan, a second loan, and a third line of credit (LOC)) have parameters as shown in Table 5.

TABLE 5

| Bucket Number | Loan 1 | Loan 2 | LOC 3 |
|---|---|---|---|
| Principal Balance | $1,000 | $2,000 | — |
| Total Balance | — | — | $3,000 |
| Proportion | 1000/6000 | 2000/6000 | 3000/6000 |
| Amount Past Due (used later) | 500 | 1000 | 750 |

A payment of $2,000 is applied to the three linked accounts according to a payment configuration based on a pro rata application of the payment to past due amounts of the linked accounts based on relative sizes of balances of the linked plans as shown in Table 6. As shown in Table 6, the payment is applied pro rata up to a point at which a past amount due, or amount past due (APD) of any of the linked accounts is paid off. At that point, the remaining payment is applied pro rata to the linked accounts having remaining past due amounts.

TABLE 6

| Payment Amount Remaining | Loan 1 Portion (Cumulative) | Loan 2 Portion (Cumulative) | LOC 3 Portion (Cumulative) | Note |
|---|---|---|---|---|
| $2,000 | $0 | $0 | $0 | — |
| $500 | $[250 = 1500*1000/6000] ($250) | $[500 = 1500*2000/6000] ($500) | $[750 = 1500*3000/6000] ($750) | Hit APD Cap of LOC 3 |
| $0 | $[166.67 = 500 * 1000/3000] ($416.67) | $[333.33 = 500 * 2000/3000] ($833.33) | $750 ($750) | Nothing Allocated to LOC 3 since APD = 0 already. Proportion of other two adjusted to remove LOC 3 from proportion. |

Based on the payment allocation of Table 6, of the $2,000 payment, $416.67 is applied to the first loan, $833.33 is applied to the second loan, and $750 is applied to the third LOC.

In some embodiments, the payment configuration may be based on interest rates of the linked plans A, B, C, 510, 520, 530. The past due amounts of the linked plans A, B, C, 510, 520, 530 may be paid in order of descending interest rates, such that a past due amount associated with a highest interest rate is paid first. In an example, the linked plan A 510 has an interest rate of 10%, the linked plan B 520 has an interest rate of 8%, and the linked plan C 530 has an interest rate of 12%. The payment is applied to a past due amount of the linked plan C 530, a remaining portion, if any, of the payment is applied to a past due amount of the linked plan A 510, and a further remaining portion, if any, is applied to a past due amount of the linked plan B 520.

In another example, four linked accounts (a first loan, a LOC X, a second loan, and a LOC Y) have parameters as shown in Table 7.

TABLE 7

| Account | Interest Rate | Amount Past Due |
|---|---|---|
| Loan 1 | 20% | $1,000 |
| LOC X | 10% - Primary | $120 |
| Loan 2 | 0% | $3,000 |
| LOC Y | 15% - Primary | $0 |

A payment of $2,000 is applied to the four linked accounts according to a payment configuration based on descending interest rates as shown in Table 8. As shown in Table 8, the payment is applied to amounts past due in order of descending interest rates.

TABLE 8

| Payment Amount Remaining | Loan 1 Portion (Cumulative) | LOC Y Portion | LOC X Portion | Loan 2 Portion |
|---|---|---|---|---|
| $2,000 | $0 | $0 | $0 | $0 |
| $1,000 | $1,000 | $0 | $0 | $0 |
| $1,000 | $1,000 | $0 (APD = 0 so nothing allocated even though interest rate is second highest | $0 | $0 |
| $880 | $1,000 | $0 | $120 | $0 |
| $0 | $1,000 | $0 | $120 | $880 |

Based on the payment allocation of Table 8, of the $2,000 payment, $1,000 is applied to the first loan to pay off the amount past due of the first loan, $120 is applied to the LOC X to pay off the amount past due of the LOC X, and $880 is applied to the second loan. No portion of the payment is applied to the LOC Y, as the LOC Y does not have an amount past due.

In some embodiments, the payment configuration may include information on applying remaining funds when the past due amounts of the linked plans A, B, C, 51, 52, 530 are paid off. Any of the payment configurations discussed herein based on due amounts may include the information on applying remaining funds.

In some embodiments, the remaining funds may be applied to the linked plans A, B, C, 51, 52, 530 based on chronological order of future payments of fixed capacity plans of the linked plans A, B, C, 51, 52, 530. For example, if a payment is applied at the contract date 522 and the linked plan A 510 and the linked plan B 520 do not have any past due amounts, a portion of the payment is applied to the second payment date 516, as it is the first, chronologically, future payment, a remaining portion, if any, is applied to the first payment date 524, a further remaining portion, if any, is applied to the third payment date 518, and a final remaining portion, if any, is applied pro rata to the second payment date 526 and the first payment date 534 having a same date.

In another example, three linked accounts (a first loan, a second loan, and a third loan) have future due amounts as shown in Table 9.

TABLE 9

| Loan 1 | Loan 2 | Loan 3 |
|---|---|---|
| May 10, 2022 - $100 | Jun. 8, 2022 - $75 | May 21, 2022 - $200 |
| Jun. 10, 2022 - $100 | Jul. 8, 2022 - $75 | Jun. 21, 2022 - $200 |
| Jul. 10, 2022 - $100 | Aug. 8, 2022 - $75 | Jul. 21, 2022 - $200 |

A payment of $400 is applied to the three linked accounts according to a payment configuration based on a chronological order of the future due amounts. Thus, the $400 payment is applied to the nearest future date until the $400 payment is exhausted. The $400 payment is applied to the 05/10/2022 future payment of $100 of the first loan, the 05/21/2022 future payment of $200 of the third loan, and the 06/08/2022 future payment of $75 of the second loan. The remaining $25 of the payment is applied to the 06/10/2022 future payment of $100 of the first loan. Thus, $125 is applied to the first loan, $75 is applied to the second loan, and $200 is applied to the third loan.

In some embodiments, the remaining funds may be applied to future payments of fixed capacity plans of the linked plans A, B, C, 51, 52, 530 based on a chronological order of the contract dates 512, 522, and 532 of the linked plans A, B, C, 51, 52, 530. In an example, a payment is applied just after the second payment date 516, and the linked plan A 510 and the linked plan B 520 do not have past due amounts. A portion of the payment is applied to the third payment 518 and a remaining portion is applied to the first payment 524 based on the contract date 512 being before the contract date 522.

In another example, three linked loans (a first loan, a second loan, and a third loan) have future payments as shown in Table 10.

TABLE 10

| Loan 1 | Loan 2 | Loan 3 |
|---|---|---|
| Contract Date: Jan. 1, 2022 | Contract Date: Feb. 1, 2022 | Contract Date: Mar. 1, 2022 |
| May 10, 2022 - $100 | Jun. 8, 2022 - $75 | May 21, 2022 - $200 |
| Jun. 10, 2022 - $100 | Jul. 8, 2022 - $75 | Jun. 21, 2022 - $200 |
| Jul. 10, 2022 - $100 | Aug. 8, 2022 - $75 | Jul. 21, 2022 - $200 |

A payment of $400 is applied to the future payments of the three linked accounts according to a payment configuration based on a chronological order of the contract dates of the three linked loans. Thus, the $400 payment is applied to the nearest future payment of the first loan of $100, then the nearest future payment of the second loan of $75, then the nearest future payment of the third loan of $200, then the next nearest payment of the first loan of $100. Thus, of the $400 payment, $125 is applied to the first loan, $75 is applied to the second loan, and $200 is applied to the third loan.

In some embodiments, the payment exceeds payoff amounts of the linked plans A, B, C, 510, 520, 530. A remaining portion of the payment may be applied to the flexible capacity plan.

In some embodiments, the payment configuration may be based on a pro rata chronological order of future due amounts of the linked plans A, B, C, 510, 520, 530. In an example, a payment is made at the contract date 522 and the linked plan A 510 and the linked plan B 520 do not have past due amounts. The payment is applied, according to a payment configuration based on pro rata chronological order of future due amounts, pro rata to the second payment date 516 and the first payment date 524, as those are the first next payments of the linked plan A 510 and the linked plan B 520, respectively. A remaining portion of the payment, if any, is applied pro rata to the third payment date 518 and the second payment date 526, as those are the second next payments of the linked plan A 510 and the linked plan B 520, respectively.

In another example, three linked loans (a first loan, a second loan, and a third loan) have future due payments as shown in Table 11.

TABLE 11

| Account | Next Scheduled Payment | Next + 1 | Next + 2 |
| --- | --- | --- | --- |
| Loan 1 | $100 | $100 | — |
| Loan 2 | $200 | $200 | $200 |
| Total | $600 | $600 | $500 |

A payment of $300 is applied, according to a payment configuration based on pro rata chronological order of future due amounts, as shown in Table 12.

TABLE 12

| Payment Amount Remaining | Loan 1 Cumulative | Loan 2 Cumulative | Loan 3 Cumulative |
| --- | --- | --- | --- |
| $300 | $0 | $0 | $0 |
| $0 | $[50 = 300 * 100/600] | $[100 = 300 * 200/600] | $[150 = 300 * 300/600] |

Based on the payment allocation of Table 12, of the $300 payment, $50 is applied to the first loan, $100 is applied to the second loan, and $150 is applied to the third loan.

In yet another example, three linked loans (a first loan, a second loan, and a third loan) have future due payments as shown in Table 11. A payment of $1,400 is applied, according to a payment configuration based on pro rata chronological order of future due amounts, as shown in Table 13.

TABLE 13

| Payment Amount Remaining | Loan 1 Cumulative | Loan 2 Cumulative | Loan 3 Cumulative |
| --- | --- | --- | --- |
| $1400 | $0 | $0 | $0 |
| $800 | $100 | $200 | $300 |
| $200 | $200 | $400 | $600 |
| $0 | $200 (no scheduled payment for this vertical) | $480 (400 + (200 * 200/500)) | $720 (600 + (200 * 300/500)) |

Based on the payment allocation of Table 13, of the $1,400 payment, $200 is applied to the first loan, $480 is applied to the second loan, and $720 is applied to the third loan.

In some embodiments, the payment configuration may be based on a pro rata application of the payment to future due amounts of the linked plans A, B, C, 510, 520, 530 based on relative sizes of balances of the linked plans A, B, C, 510, 520, 530. Thus, the payment is applied to the future due amounts, with linked plans with higher balances receiving proportionally larger portions of the payment. In an example, three linked accounts (a first loan, a second loan, and a LOC X) have parameters as shown in Table 14.

TABLE 14

| Loan | Principal (Total Balance) | Payoff (Total Balance) |
|---|---|---|
| Loan 1 | $1000 | $1100 |
| Loan 2 | $2000 | $2100 |
| LOC X | $3000 | $3000 |
| Total | $6000 | Not Relevant |

A payment of $1,000 is applied, according to a payment configuration based on a pro rata application of the payment to future due amounts of the linked accounts based on relative sizes of balances of the linked accounts, as shown in Table 15.

TABLE 15

| Payment Amount Remaining | Loan 1 Cumulative | Loan 2 Cumulative | LOC X Cumulative |
|---|---|---|---|
| $1000 | $0 | $0 | $0 |
| $0 | $[166.67 = 1000 * 1000/6000] | $[333.33 = 1000 * 2000/6000] | $[500 = 1000 * 3000/6000] |

Based on the payment allocation of Table 15, of the $1,000 payment, $166.67 is applied to the first loan, $333.33 is applied to the second loan, and $500 is applied to the LOC X.

In another example, three linked accounts (a first loan, a second loan, and a LOC X) have parameters as shown in Table 14. A payment of $6,050 is applied, according to a payment configuration based on a pro rata application of the payment to future due amounts of the linked accounts based on relative sizes of balances of the linked accounts, as shown in Table 16.

TABLE 16

| Payment Amount Remaining | Loan 1 Cumulative | Loan 2 Cumulative | LOC X Cumulative |
|---|---|---|---|
| $6050 | $0 | $0 | $0 |
| $50 | $1000 | $2000 | $3000 (Hit Payoff Cap) |
| $0 | $1016.67 (1000 + (50 * 1000/3000)) | $2033.33 ((2000 + (50 * 2000/3000)) | $3000 (Still at Payoff Cap) |

Based on the payment allocation of Table 16, of the $6,050 payment, $1016.67 is applied to the first loan, $2033.33 is applied to the second loan, and $3000 is applied to the LOC X.

In yet another example, three linked accounts (a first loan, a second loan, and a third loan) have parameters as shown in Table 17.

TABLE 17

| Loan | Principal (Total Balance) | Payoff (Total Balance) |
|---|---|---|
| Loan 1 | $1000 | $1100 |
| Loan 2 | $2000 | $2100 |
| Loan 3 | $2500 | $3500 (Loan has lots of interest) |
| Total | $5500 | Not Relevant |

A payment of $7,000 is applied, according to a payment configuration based on a pro rata application of the payment to future due amounts of the linked accounts based on relative sizes of balances of the linked accounts, with a remainder being applied to the flexible capacity plan, as shown in Table 18.

TABLE 18

| Payment Amount Remaining | Loan 1 Cumulative | Loan 2 Cumulative | Loan 3 Cumulative |
|---|---|---|---|
| $7000 | $0 | $0 | $0 |
| $1225 (5775 used) | (5775 * (1000/5500)) = $1050 | $2100 (Hit Payoff Cap) | (5775 * (2500/5500)) = $2625 |
| $1050 (another 175 used) | (Previous + 175 * (1000/3500) = $1100 (Hit Payoff Cap) | $2100 (Still at Payoff Cap) | (Previous + 175 * (2500/3500) = $2750 |
| $300 (another 750 used) | $1100 (Still at Payoff Cap) | $2100 (Still at Payoff Cap) | Previous + 750 * (2500/2500) = 3500 (Hit Payoff Cap) |

Remaining $300 goes to Main LOC

Based on the payment allocation of Table 16, of the $7,000 payment, $1100 is applied to the first loan, $2100 is applied to the second loan, $3500 is applied to the third loan, and $300 is applied to the main LOC, or the flexible capacity plan to which the linked accounts are linked.

In some embodiments, the payment configuration may be based on application of the payment to future due amounts of the linked plans A, B, C, 510, 520, 530 based on descending interest rates of the linked plans A, B, C, 510, 520, 530, such that a future due amount associated with a highest interest rate is paid first. In an example, the linked plan A 510 has an interest rate of 10%, the linked plan B 520 has an interest rate of 8%, and the linked plan C 530 has an interest rate of 12%. The payment is applied to a future due amount of the linked plan C 530, a remaining portion, if any, of the payment is applied to a future due amount of the linked plan A 510, and a further remaining portion, if any, is applied to a future due amount of the linked plan B 520.

In an example, four linked accounts (a first loan, a second loan, a LOC X, and a LOC Y) have parameters as shown in Table 19.

TABLE 19

| Loan | Interest Rate | Payoff (Total Balance) |
|---|---|---|
| Loan 1 | 20% | $1100 |
| Loan 2 | 0% | $2100 |
| LOC X | 10% | $3000 |
| LOC Y | 15% | $0 |

A payment of $2,000 is applied, according to a payment configuration based on application of the payment to future due amounts of the linked accounts based on descending interest rates of the linked accounts, as shown in Table 20.

TABLE 20

| Payment Amount Remaining | Loan 1 Cumulative | Loan 2 Cumulative | LOC X Cumulative | LOC Y Cumulative |
|---|---|---|---|---|
| $2000 | $0 | $0 | $0 | $0 |
| $900 | $1100 | $0 | $0 | $0 |
| $900 | $1100 | $0 | $0 | $0 (Nothing Allocated since Total Balance = 0) |
| $0 | $1100 | $0 | $900 | $0 |

Based on the payment allocation of Table 20, of the $2,000 payment, $1100 is applied to the first loan, and $900 is applied to the LOC X.

A payment configuration may include any combination of application to past due amounts and application to future due amounts. If the payment exceeds the past due amounts, a remainder of the payment is applied to the future due amounts, according to the payment configuration. Similarly, a payment configuration may control whether the flexible capacity plan to which the linked plans A, B, C, 510, 520, 530, are linked is included in the application of the payment, as discussed herein.

In some embodiments, the payment configuration may be determined by a type of the flexible capacity plan to which the linked plans A, B, C, 510, 520, 530, are linked. In other embodiments, the payment configuration may be determined by a provider. In yet other embodiments, the payment configuration may be determined by a borrower (customer of the provider). In an example, a credit card issuer may set payment configurations for loans linked to a customer's credit card account. In another example, a credit card issuer may allow a customer to set payment configurations for loans linked to the customer's credit card account. In yet another example, a credit card issuer may allow a customer to set payment configurations for individual payments to the customer's credit card account which will be applied to loans linked to the customer's credit card account. In some embodiments, a customer is unaware of the payment configurations. In some embodiments, a customer is unaware of the linked loans and the payment configurations. For example, a credit card issuer may roll off portions of a balance and/or an available credit of a customer's credit card account into linked accounts which affect a balance and/or available credit of the customer's credit card account. The customer may make payments to the credit card account which are applied to the linked accounts.

Figure 10:
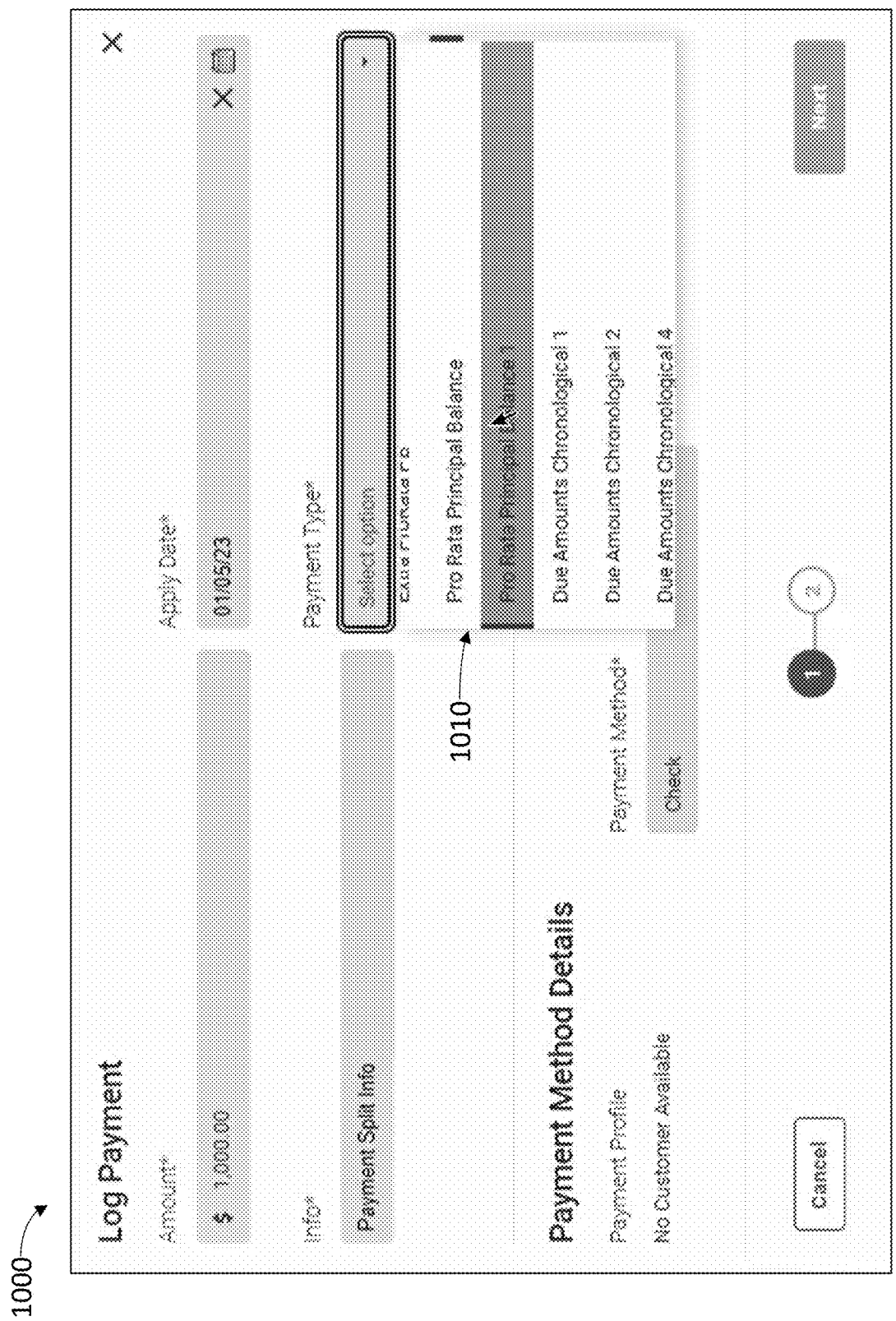
FIG. 10 illustrates another example user interface, according to some embodiments.

In some embodiments, the payment configuration may be selected from a library of predetermined payment configurations, as discussed in conjunction with FIG. 10.

FIG. 6 illustrates an example record 600 of a payment to a flexible capacity plan applied to linked capacity plans, according to some embodiments. The flexible capacity plan may function as a wrapper for linked capacity plans such that payments made to the flexible capacity plan are applied to the linked capacity plans, as discussed herein. The payment may be allocated to the linked capacity plans according to a payment configuration, as described herein. The record 600 may be generated to show how the payment is applied to the linked capacity plans. The record 600 may include split details. The split details may show how a $1,000 payment is applied to a first loan, a second loan, and a child LOC such that, of the $1,000 payment, $709.95 is applied to the first loan, $236,87 is applied to the second loan, and $53.18 is applied to the child LOC. In some embodiments, the record 600 may be displayed to a provider. In other embodiments, the record 600 may be displayed to a customer of a provider. In an example, a credit card issuer may receive a customer payment to a customer's credit card account, apply the customer payment to the linked accounts based on the record 600, update the linked accounts according to the customer payment, and transmit a notification to the customer of the customer payment being applied to the customer's credit card account. In this way, the customer interacts with the flexible capacity plan as a wrapper for the linked accounts without having to manage details of the linked accounts. In another example, a credit card issuer may receive a customer payment to a customer's credit card account, apply the customer payment to the linked accounts based on the record 600, update the linked accounts according to the customer payment, and transmit the record 600 to the customer. In this way, the customer interacts with the flexible capacity plan as a wrapper for the linked accounts while seeing details of the linked accounts.

Figure 7:
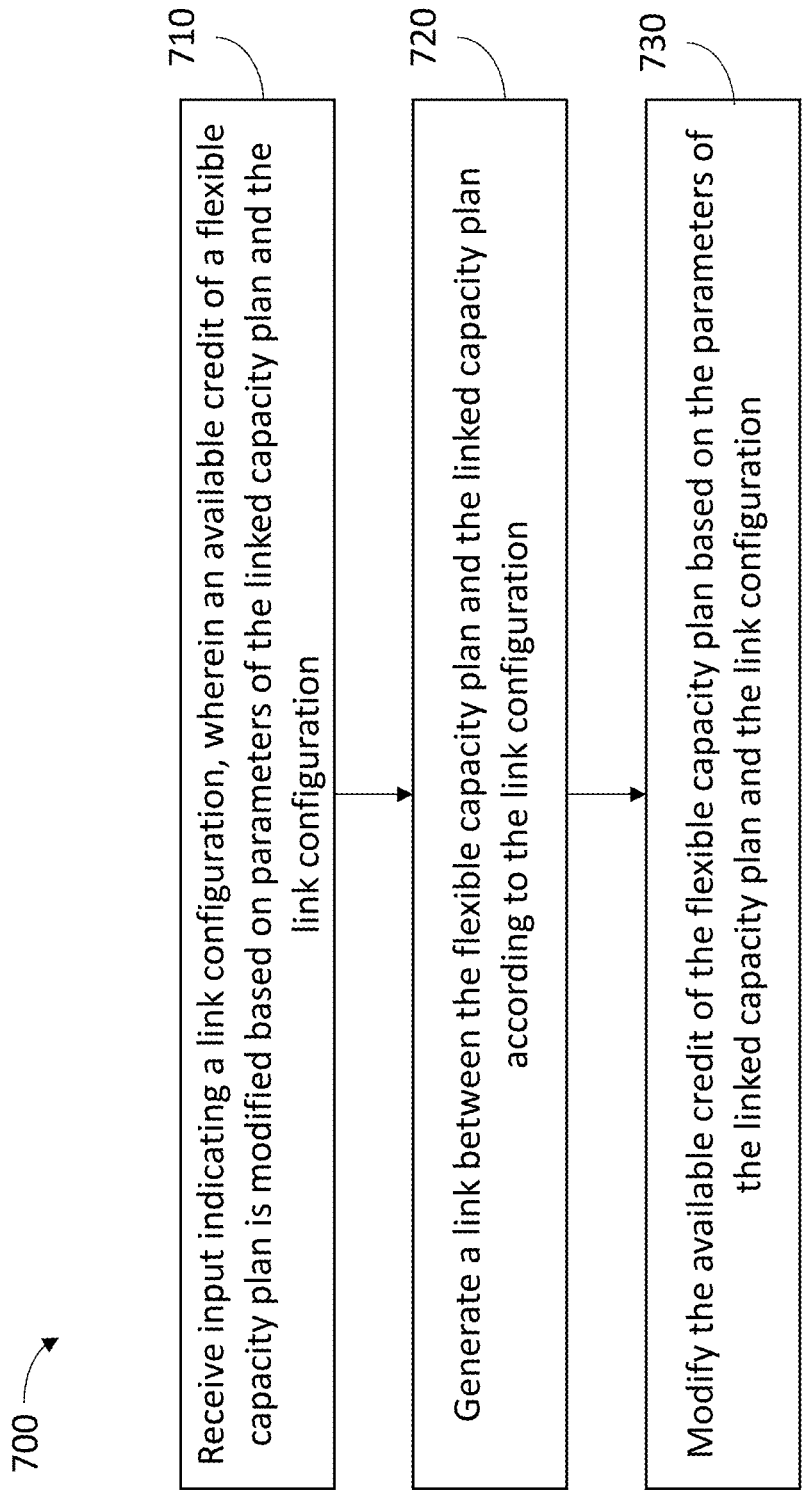
FIG. 7 is a flowchart illustrating operations for linking capacity plans, according to some embodiments.

FIG. 7 is a flowchart illustrating operations of a method 700 for linking capacity plans, according to some embodiments. The method 700 may include more or fewer operations than shown. The operations may be performed in the order shown, in a different order, or concurrently. The method 700 may be performed by a server. The server may include a memory and a processor. The memory may include a non-transitory computer-readable medium which, when executed by the processor, causes the processor to perform the operations of the method 700. The server may be any computing device capable of performing the operations of the method 700. In some embodiments, the method 700 may be performed by the capacity plan management server 140 of FIG. 1.

The server may receive 710 input indicating a link configuration, wherein an available credit of a flexible capacity plan is modified based on parameters of the linked capacity plan and the link configuration. The parameters of the flexible capacity plan may include an interest rate, a balance, the available credit, and one or more containers (or buckets), as discussed herein. The link configuration may modify the available credit to increase or decrease the available credit, as discussed herein. In some embodiments, the link configuration may increase the available credit by an amount of available credit of the linked capacity plan, where the linked capacity plan is a flexible capacity plan. In some embodiments, the link configuration may decrease the available credit by an amount of a balance of the linked capacity plan. In an example, the linked capacity plan is a linked flexible capacity plan having an available credit of $500, causing the available credit of the flexible capacity plan to increase by $500. In some embodiments, the input is from a provider which transmits a command to the server indicating the link configuration. In other embodiments, the input is from a customer of a provider, where the customer transmits a command to the server including an indication of the link configuration. In yet other embodiments, the input is from a customer of a provider, where the provider transmits a command to the server including the indication of the link configuration.

The server may generate 720 a link between the flexible capacity plan and the linked capacity plan according to the link configuration. In some embodiments, generating 720 the link may include creating the link in a database storing the flexible capacity plan and the linked capacity plan, such that a relationship exists in the database between the flexible capacity plan and the linked capacity plan. In some embodiments, the generated link may be the link data structure 900 of FIG. 9.

The server may modify 730 the available credit of the flexible capacity plan based on the parameters of the linked capacity plan and the link configuration. In some embodiments, modifying 730 the available credit of the flexible capacity plan includes increasing the available credit by an amount of available credit of the linked capacity plan. In other embodiments, modifying 730 the available credit of the flexible capacity plan includes decreasing the available credit by a balance of the linked capacity plan. In some embodiments, modifying 730 the available credit of the flexible capacity plan includes modifying the parameters of the flexible capacity plan in a database storing the flexible capacity plan and the linked capacity plan.

In some embodiments, the linked capacity plan is a fixed capacity plan. The fixed capacity plan may include a principal amount and a payoff amount. In some embodiments, the link configuration causes the available credit to be reduced by the principal amount of the fixed capacity plan. In other embodiments, the link configuration causes the available credit to be reduced by the payoff amount of the fixed capacity plan.

In some embodiments, the linked capacity plan is a second flexible capacity plan. The second flexible capacity plan may include an available credit of the second flexible capacity plan. In some embodiments, the link configuration causes the available credit of the flexible capacity plan to be increased by the available credit of the linked second flexible capacity plan.

In some embodiments, the server generates the linked capacity plan based on a balance of the flexible capacity plan. For example, a portion of the balance of the flexible capacity plan may be converted into a principal balance of the linked capacity plan, where the linked capacity plan is a fixed capacity plan. In another example, a portion of the balance of the flexible capacity plan may be converted into a balance of the linked capacity plan, where the linked account is a flexible capacity plan. In some embodiments, generating the linked capacity plan includes selecting a portion of the balance of the flexible capacity plan to be a principal of the linked account, determining parameters of the linked account including a term, interest rate, and billing cycle of the linked account, and generating the linked account based on the principal of the linked account and the parameters of the linked account. In some embodiments, the parameters of the linked account are based on the link configuration, and/or the parameters of the flexible capacity plan.

In some embodiments, the server generates the linked capacity plan based on an available credit of the flexible capacity plan. For example, a portion of the available credit of the flexible capacity plan may be converted into an available credit, of the linked capacity plan, where the linked capacity plan is a flexible capacity plan. In another example, a portion of the available credit of the flexible capacity plan may be converted into a principal balance of the linked capacity plan, where the linked capacity plan is a fixed capacity plan.

In some embodiments, the server receives user input including parameters of a second linked capacity plan and a second link configuration, generates the second linked capacity plan, and generates a second link between the flexible capacity plan and the second linked capacity plan according to the second link configuration. In some embodiments, the second linked capacity plan is a flexible capacity plan. In other embodiments, the second linked capacity plan is a fixed capacity plan.

Figure 8:
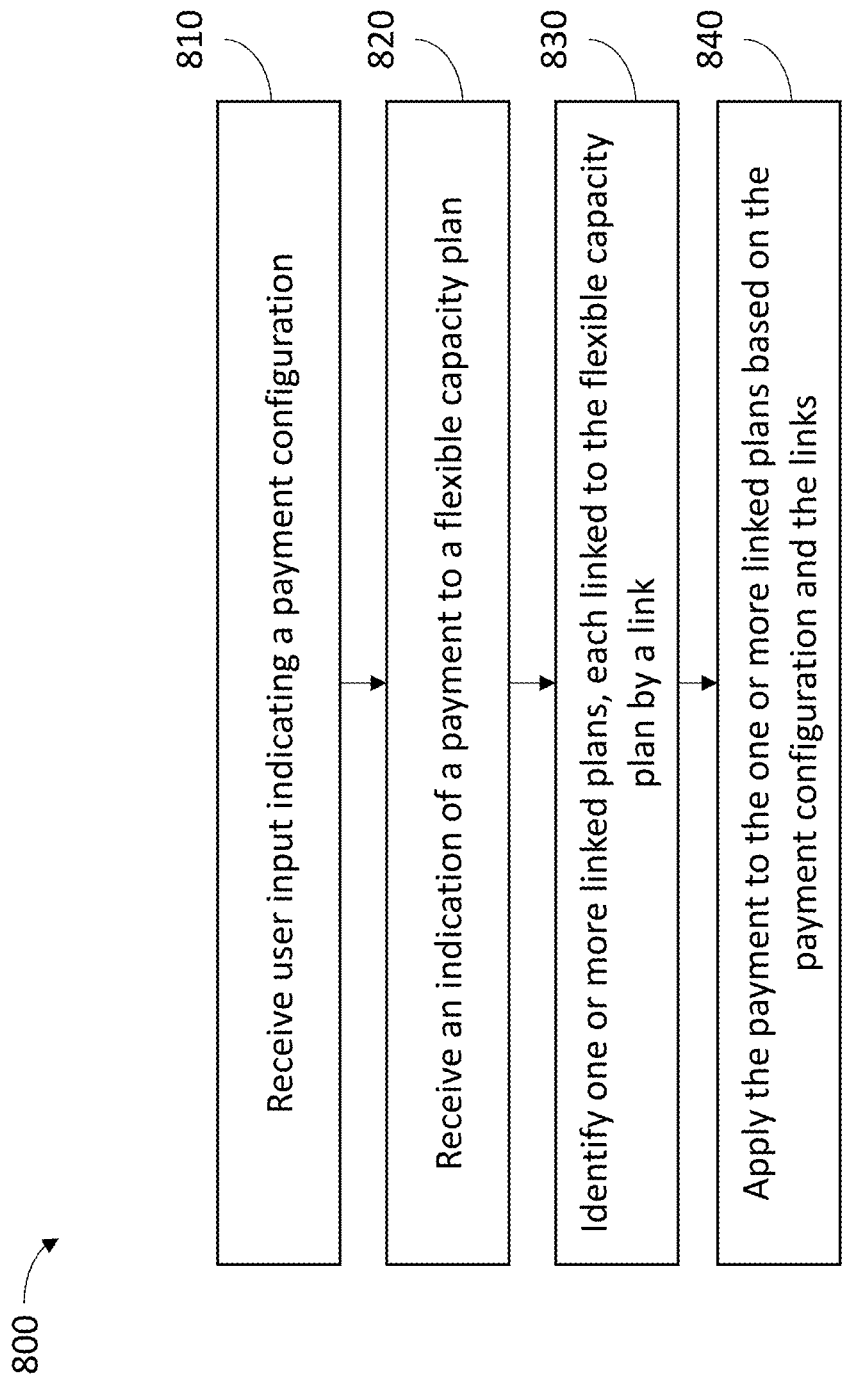
FIG. 8 is a flowchart illustrating operations for applying payments to linked capacity plans, according to some embodiments.

FIG. 8 is a flowchart illustrating operations of a method 800 for applying payments to linked capacity plans, according to some embodiments. The method 800 may include more or fewer operations than shown. The operations may be performed in the order shown, in a different order, or concurrently. The method 800 may be performed by a server. The server may include a memory and a processor. The memory may include a non-transitory computer-readable medium which, when executed by the processor, causes the processor to perform the operations of the method 800. The server may be any computing device capable of performing the operations of the method 800. In some embodiments, the method 800 may be performed by the capacity plan management server 140 of FIG. 1.

The server may receive 810 user input indicating a payment configuration. In some embodiments, the user is a provider. In some embodiments, the user input is based on input received, by the provider, from a customer of the provider. The payment configuration may be based on parameters of the input and/or the linked capacity plans. For example, the payment configuration may be based on due amounts, contract dates, interest rates, and other parameters, as discussed herein. In some embodiments, the user input includes a selection of the payment configuration from a library of predetermined payment configurations, as discussed in conjunction with FIG. 10.

The server may receive 820 an indication of a payment to a flexible capacity plan. In some embodiments, the indication of the payment includes the payment configuration. In some embodiments, the payment configuration is selected from a library of predetermined payment configurations, as discussed in conjunction with FIG. 10.

The server may identify 830 one or more linked plans, each linked to the flexible capacity plan by a link. The one or more linked plans may be associated with a customer of a provider, where the customer is associated with the flexible capacity plan. In some embodiments, identifying 830 the one or more linked plans includes identifying the one or more linked plans in the indication of the payment and/or the payment configuration. In some embodiments, identifying 830 the one or more linked plans includes identifying the one or more linked plans in a database including the flexible capacity plan and the one or more linked plans. In some embodiments, identifying 830 the one or more linked plans in the database includes identifying the one or more linked plans based on the flexible capacity plan and the links between the flexible capacity plan and the one or more linked plans. In some embodiments, the server receives a user input including parameters of the link. In some embodiments, the user input may be from a provider associated with the flexible capacity plan. The user input may be from the provider, based on input received, by the provider, from a customer of the provider associated with the flexible capacity plan.

The server may apply 840 the payment to the one or more linked plans based on the payment configuration and the links.

In some embodiments, the server may determine a contract date of each of the one or more linked plans, wherein the payment configuration is based on the contract dates of the one or more linked plans. For example, the payment configuration may be based on a chronological order of the contract dates, as discussed herein. In some embodiments, applying 840 the payment to the one or more linked plans based on the payment configuration and the links includes applying the payment to the linked plans such that a first linked plan with a first contract date is paid in full before applying the payment to a second linked plan having a second contract date later than the first contract date.

In some embodiments, the server may determine a type of due amount for each of the one or more linked plans, wherein the payment configuration is based on the types of due amounts of the one or more linked plans. For example, the payment configuration may be based on due amounts being past due. In some embodiments, the server applies 840 the payment to a past due type of due amounts before applying the payment to other types of due amounts.

In some embodiments, the payment configuration includes applying a portion of the payment to a balance of the flexible capacity plan. In some embodiments, the payment configuration is based on user input to apply the portion of the payment to the balance of the flexible capacity plan.

In some embodiments, the server determines payment due dates for each of the one or more linked plans. In some embodiments, the payment configuration is based on the payment due dates of the one or more linked plans. For example, the payment may be applied, based on the payment configuration, to payments of the one or more linked plans in chronological order of due dates, as discussed herein.

In some embodiments, the server generates a record of how the payment is applied. In some embodiments, the record includes, for each linked plan to which the payment was applied, an indication of an amount of the payment which was applied to each linked plan, as discussed herein.

Figure 9:
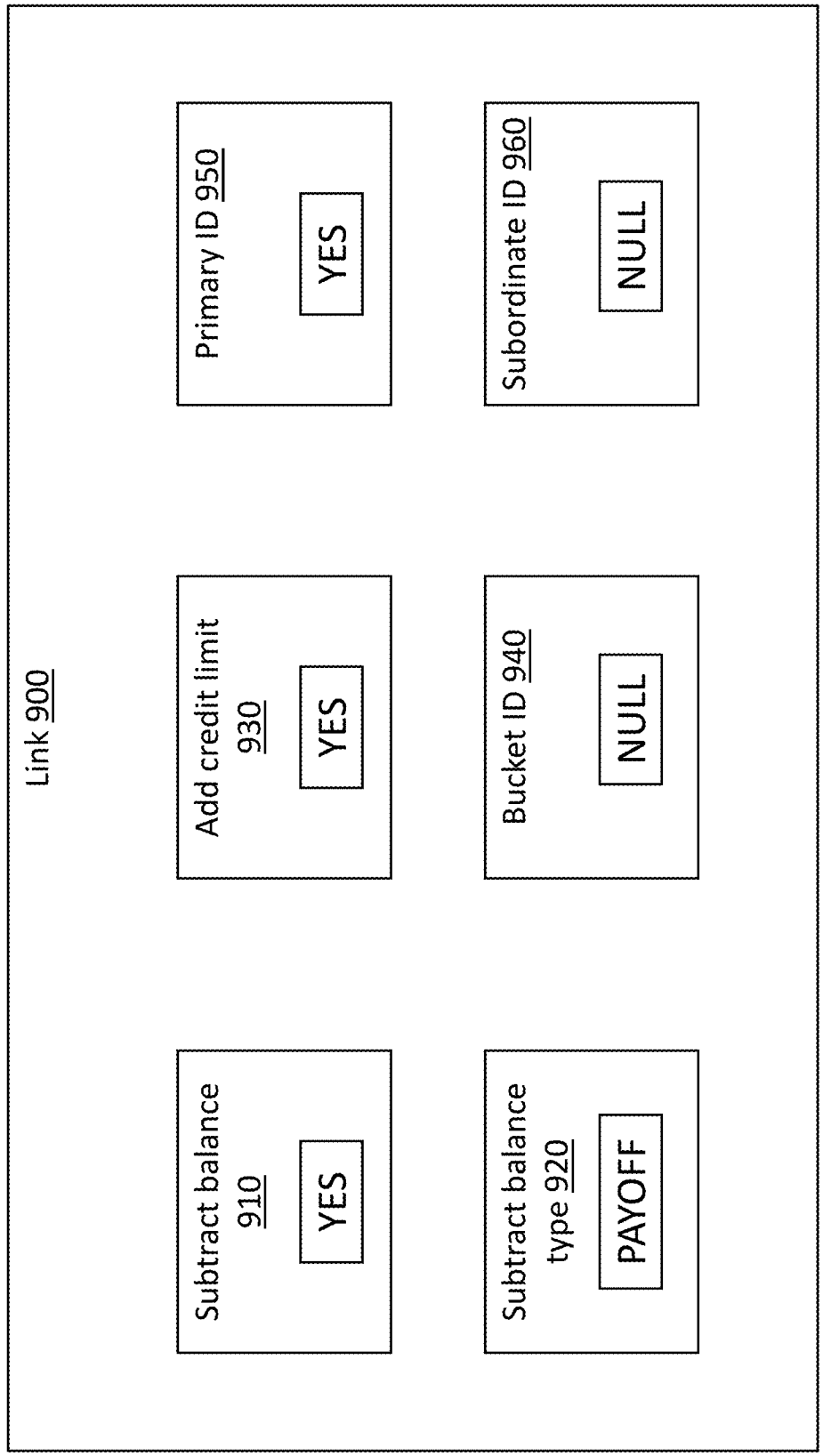
FIG. 9 is a block diagram of an example link data structure 900, according to some embodiments.

FIG. 9 is a block diagram of an example link data structure 900. The link data structure 900 may link a primary capacity plan with a subordinate capacity plan. For example, the link data structure 900 may link a fixed capacity plan to a primary flexible capacity plan. In some embodiments, the link data structure 900 may be a link of the links 247 of FIG. 2. The link data structure 900 may include a subtract balance parameter 910. The subtract balance parameter 910 determines whether a balance of the subordinate capacity plan affects an available credit of the primary capacity plan. For example, the subtract balance parameter 910 may have a value "yes" or "1" indicating that the balance of the subordinate capacity plan is to be subtracted from an available credit of the primary capacity plan.

The link data structure may include a subtract balance type parameter 920. The subtract balance type parameter 920 may determine which balance of the subordinate capacity plan affects the available credit of the primary capacity plan. In an example, the subtract balance type parameter 920 is "primary" meaning that a primary balance of the subordinate capacity plan affects the available credit of the primary capacity plan. In another example, the subtract balance type parameter 920 is "payoff" meaning that a payoff balance of the subordinate capacity plan affects the available credit of the primary capacity plan.

In some embodiments, the link data structure 900 may include an add credit limit parameter 930 which determines whether an available credit of the subordinate capacity plan affects the available credit of the primary capacity plan. In an example, the subordinate capacity plan is a line of credit having an available credit which is added to the available credit of the primary capacity plan based on the add credit limit parameter 930 being "yes."

In some embodiments, the link data structure 900 may include a bucket ID parameter 940. The bucket ID parameter may identify a container (or bucket) of the primary capacity plan to which the subordinate capacity plan is linked, such that the container is affected by the subordinate capacity plan based on the subtract balance parameter 910, the subtract balance type parameter 920, and the add credit limit parameter 930. In an example, the container is a healthcare bucket of the primary capacity plan and the subordinate capacity plan is a healthcare-related fixed capacity plan linked to the healthcare bucket. The payoff balance of the healthcare-related fixed capacity plan is subtracted from an available credit of the healthcare bucket based on the subtract balance parameter 910 being "yes," the subtract balance type parameter 920 being "payoff," and the bucket ID parameter 940 being a bucket ID of the healthcare bucket.

The link data structure 900 may include a primary ID parameter 950 which is an identifier of the primary capacity plan. The link data structure 900 may include a subordinate ID parameter 960 which is an identifier of the subordinate capacity plan.

FIG. 10 illustrates another example user interface 1000. The user interface 1000 may include a library of predetermined payment configurations 1010. In some embodiments, the library of predetermined payment configurations 1010 may include the payment configurations discussed in conjunction with FIG. 5. The user interface 1000 may allow a user to select a predetermined payment configuration from the library of predetermined payment configurations 1010. The selected predetermined payment configuration may determine how a payment is applied to linked capacity plans, as discussed herein.

NON-LIMITING EXAMPLES

Example 1. A system comprising a memory to store a flexible capacity plan, a linked capacity plan, a link between the flexible capacity plan and the linked capacity plan, and a processor configured to receive input indicating a link configuration, wherein an available credit of the flexible capacity plan is modified based on parameters of the linked capacity plan and the link configuration, and generate the link between the flexible capacity plan and the fixed capacity plan according to the link configuration.

Example 2. The system of example 1, wherein the linked capacity plan is a fixed capacity plan.

Example 3. The system of example 2, wherein the link configuration causes the available credit of the flexible capacity plan to be reduced by a principal amount of the fixed capacity plan.

Example 4. The system of example 2, wherein the link configuration causes the available credit of the flexible capacity plan to be reduced by a payoff amount of the fixed capacity plan.

Example 5. The system of example 1, wherein the linked capacity plan is a second flexible capacity plan.

Example 6. The system of example 5, wherein the link configuration causes the available credit of the flexible capacity plan to be increased by the available credit of the linked second flexible capacity plan.

Example 7. The system of example 1, wherein the processor is further configured to generate the linked capacity plan based on a balance of the flexible capacity plan.

Example 8. The system of example 7, wherein generating the linked plan includes selecting a portion of the balance of the flexible capacity plan to be a principal of the linked capacity plan, determining parameters of the linked capacity plan including a term, interest rate, and billing cycle of the linked capacity plan, and generating the linked capacity plan based on the principal of the linked capacity plan and the parameters of the linked capacity plan.

Example 9. The system of example 1, wherein the processor is further configured to generate the linked capacity plan based on an available credit of the flexible capacity plan.

Example 10. The system of example 1, wherein the processor is further configured to receive user input including parameters of a second linked capacity plan and a second link configuration, generate the second linked capacity plan, and generate the second link configuration.

Example 11. A system comprising a processor, and a computer-readable medium comprising instructions which, when executed by the processor, cause the processor to receive user input including a payment configuration, receive an indication of a payment to a flexible capacity plan, identify one or more linked plans, each linked to the flexible capacity plan by a link, and apply the payment to the one or more linked plans based on the payment configuration and the link.

Example 12. The system of example 11, wherein the instructions further cause the processor to receive a user input comprising parameters of the link.

Example 13. The system of example 11, wherein the instructions further cause the processor to determine a contract date of each of the one or more linked plans, wherein the payment configuration is based on the contract dates of the one or more linked plans.

Example 14. The system of example 13, wherein the applying the payment to the one or more linked plans based on the payment configuration and the link includes applying the payment to the linked plans such that a first linked plan with a first contract date is paid in full before applying the payment to a second linked plan having a second contract date later than the first contract date.

Example 15. The system of example 11, wherein the instructions further cause the processor to determine a type of due amount for each of the one or more linked plans, wherein the payment configuration is based on the types of due amounts of the one or more linked plans.

Example 16. The system of example 15, wherein the instructions further cause the processor to apply the payment to a past due type of due amounts before applying the payment to other types of due amounts.

Example 17. The system of example 11, wherein the payment configuration includes applying a portion of the payment to a balance of the flexible capacity plan.

Example 18. The system of example 11, wherein the processor is further configured to determine payment due dates for each of the one or more linked plans, wherein the payment configuration is based on the payment due dates of the one or more linked plans.

Example 19. The system of example 11, wherein the processor is further configured to generate a record of how the payment is applied.

Example 20. The system of example 19, wherein the record includes, for each linked plan to which the payment was applied, an indication of an amount of the payment which is applied to each linked plan.

Example 21. A link data structure to associate a primary capacity plan and a subordinate capacity plan, comprising an account id of the subordinate capacity plan, an account id of the primary capacity plan, and a subtract balance parameter which determines whether a balance of the subordinate capacity plan affects an available credit of the primary capacity plan.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented and/or arranged in combination in a single implementation. Conversely, various features that are described in the context of a single implementation can also be implemented and arranged in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative implementations described under other headings; headings, where provided, are included solely for the purpose of readability, and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations, implementations, illustrative embodiments, and embodiments, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, arrangements, elements, or acts of the systems and methods herein referred to in the singular may also embrace implementations including a plurality of these elements, and any references in plural to any implementation, arrangement, element, or act herein may also embrace implementations including only a single element. References in the singular or plural form are not intended to limit the presently disclosed systems or methods, or their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components, including, but not limited to, processing circuitry, network interfaces, peripheral devices, input devices, output devices, and sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments.

Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

What is claimed is:

1. A system comprising:
a database to store:
data regarding a flexible capacity plan, including an available credit of the flexible capacity plan and a balance of the flexible capacity plan;
data regarding a linked capacity plan, including a balance of the linked capacity plan;
a link data structure defining a hierarchical relationship between the flexible capacity plan and the linked capacity plan, wherein the available credit of the flexible capacity plan is modified based on parameters of the linked capacity plan, and wherein payments to the flexible capacity plan are applied to one or more of the flexible capacity plan and the linked capacity plan according to the hierarchical relationship;
a server to:
receive, via a network, input indicating a link configuration, the link configuration describing the hierarchical relationship between the flexible capacity plan and the linked capacity plan;
generate the link data structure between the flexible capacity plan and the linked capacity plan according to the link configuration, wherein generating the link data structure includes modifying the available credit of the flexible capacity plan within the database based on the parameters of the linked capacity plan.

2. The system of claim 1, wherein the linked capacity plan is a fixed capacity plan.

3. The system of claim 2, wherein the link configuration causes the available credit of the flexible capacity plan to be reduced by a principal amount of the fixed capacity plan.

4. The system of claim 2, wherein the link configuration causes the available credit of the flexible capacity plan to be reduced by a payoff amount of the fixed capacity plan.

5. The system of claim 1, wherein the linked capacity plan is a second flexible capacity plan.

6. The system of claim 5, wherein the link configuration causes the available credit of the flexible capacity plan to be increased by an available credit of the linked second flexible capacity plan.

7. The system of claim 1, the server to generate the linked capacity plan based on a balance of the flexible capacity plan.

8. The system of claim 7, the server to generate the linked capacity plan by:
selecting a portion of the balance of the flexible capacity plan to be a principal of the linked account;
determining parameters of the linked account including a term, interest rate, and billing cycle of the linked account; and
generating the linked account based on the principal of the linked account and the parameters of the linked account.

9. The system of claim 1, the server to generate the linked capacity plan based on an available credit of the flexible capacity plan.

10. The system of claim 1, the server to:
receive user input including parameters of a second linked capacity plan and a second link configuration;
generate the second linked capacity plan; and
generate a second link data structure between the flexible capacity plan and the second linked capacity plan according to the second link configuration.

11. A system comprising a processor; and
a computer-readable medium comprising instructions which, when executed by the processor, cause the processor to:
receive, via a network, user input including a payment configuration describing how payments are to be applied to linked plans;
receive, via the network, an indication of a payment to a flexible capacity plan;
identify, using a link data structure, one or more linked plans each linked to the flexible capacity plan by the link data structure, the link data structure defining a hierarchical relationship between the flexible capacity plan and the one or more linked plans; and
apply the payment to the one or more linked plans based on the payment configuration and the link data structure, wherein applying the payment to the one or more linked plans includes updating a stored balance of the one or more linked plans according to the payment configuration.

12. The system of claim 11, wherein the instructions further cause the processor to receive, via the network, a user input comprising parameters of the link data structure including one or more of an account id of the subordinate capacity plan, an account id of the primary capacity plan, and a subtract balance parameter which determines whether a balance of the subordinate capacity plan affects an available credit of the primary capacity plan.

13. The system of claim 11, wherein the instructions further cause the processor to determine a contract date of each of the one or more linked plans, wherein the payment configuration is based on the contract dates of the one or more linked plans.

14. The system of claim 13, wherein the applying the payment to the one or more linked plans based on the payment configuration and the link data structure includes applying the payment to the one or more linked plans such that a first linked plan with a first contract date is paid in full before applying the payment to a second linked plan having a second contract date later than the first contract date.

15. The system of claim 11, wherein the instructions further cause the processor to:
determine a type of due amount for each of the one or more linked plans, wherein the payment configuration is based on the types of due amounts of the one or more linked plans.

16. The system of claim 15, wherein the instructions further cause the processor to:
apply the payment to a past due type of due amounts before applying the payment to other types of due amounts.

17. The system of claim 11, wherein the payment configuration includes applying a portion of the payment to a balance of the flexible capacity plan.

18. The system of claim 11, wherein the instructions further cause the processor to:
   determine payment due dates for each of the one or more linked plans, wherein the payment configuration is based on the payment due dates of the one or more linked plans.

19. The system of claim 11, wherein the instructions further cause the processor to generate a record of how the payment is applied.

20. The system of claim 19, wherein the record includes, for each linked plan to which the payment was applied, an indication of an amount of the payment which is applied to each linked plan.

21. A system, comprising:
   a database storing a link data structure to associate a primary capacity plan and a subordinate capacity plan, the link data structure comprising:
     an account id of the subordinate capacity plan;
     an account id of the primary capacity plan; and
     a subtract balance parameter which determines whether a balance of the subordinate capacity plan affects an available credit of the primary capacity plan;
   and
   a server that executes instructions stored in a non-transitory, computer-readable medium to:
     receive, via a network, an indication of a payment to the primary capacity plan, the indication including a payment configuration describing how the payment is to be applied to plans linked to the primary capacity plan;
     identify, based on the account id of the subordinate capacity plan in the link data structure, the subordinate capacity plan; and
     modify, according to the subtract balance parameter, the balance of the subordinate capacity plan and the available credit of the primary capacity plan.

* * * * *